(12) United States Patent
Koito et al.

(10) Patent No.: US 10,302,986 B2
(45) Date of Patent: May 28, 2019

(54) DISPLAY DEVICE

(71) Applicant: Japan Display Inc., Minato-ku (JP)

(72) Inventors: Takeo Koito, Tokyo (JP); Yudai Numata, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/659,859

(22) Filed: Jul. 26, 2017

(65) Prior Publication Data

US 2018/0031878 A1    Feb. 1, 2018

(30) Foreign Application Priority Data

Jul. 29, 2016 (JP) .................................. 2016-149917

(51) Int. Cl.
*G02F 1/00* (2006.01)
*G02F 1/1335* (2006.01)
*G02F 1/03* (2006.01)
G02F 1/13363 (2006.01)
G02F 1/136 (2006.01)

(52) U.S. Cl.
CPC .......... *G02F 1/1335* (2013.01); *G02F 1/0063* (2013.01); *G02F 1/0311* (2013.01); *G02F 1/136* (2013.01); *G02F 2001/133638* (2013.01)

(58) Field of Classification Search
CPC .... G02F 1/0063; G02F 1/0311; G02F 1/1335; G02F 1/136; G02F 2001/133638
See application file for complete search history.

(56) References Cited

U.S. PATENT DOCUMENTS

| 5,621,572 | A | * | 4/1997 | Fergason | ........... | G02B 27/0172 |
| | | | | | | 359/630 |
| 5,861,993 | A | * | 1/1999 | Shanks | .................. | G02B 5/124 |
| | | | | | | 359/629 |
| 9,698,849 | B2 | * | 7/2017 | Juni | ..................... | H04B 1/3888 |
| 10,048,495 | B2 | * | 8/2018 | Koito | ................. | G02B 27/0018 |
| 2017/0031157 | A1 | | 2/2017 | Koito et al. | | |

FOREIGN PATENT DOCUMENTS

| JP | 2011-253128 | 12/2011 |
| JP | 2013-182121 | 9/2013 |
| JP | 2015-040944 | 3/2015 |
| JP | 2017-032644 | 2/2017 |

* cited by examiner

*Primary Examiner* — Seung H Lee
(74) *Attorney, Agent, or Firm* — Oblon, McClelland, Maier & Neustadt, L.L.P.

(57) ABSTRACT

According to one embodiment, a display device includes an illumination unit, a polarizing element which transmits a specific polarized component of light entering from the illumination unit, a display panel which transmits the polarized light entering from the polarizing element while maintaining or converting a polarized state, an optical element comprising a transmission axis which transmits first linearly polarized light, which transmits or reflects the light entering from the display panel and a reflective element which retro-reflects the light reflected by the optical element, and the display panel and the reflective element face one surface of the optical element.

14 Claims, 19 Drawing Sheets

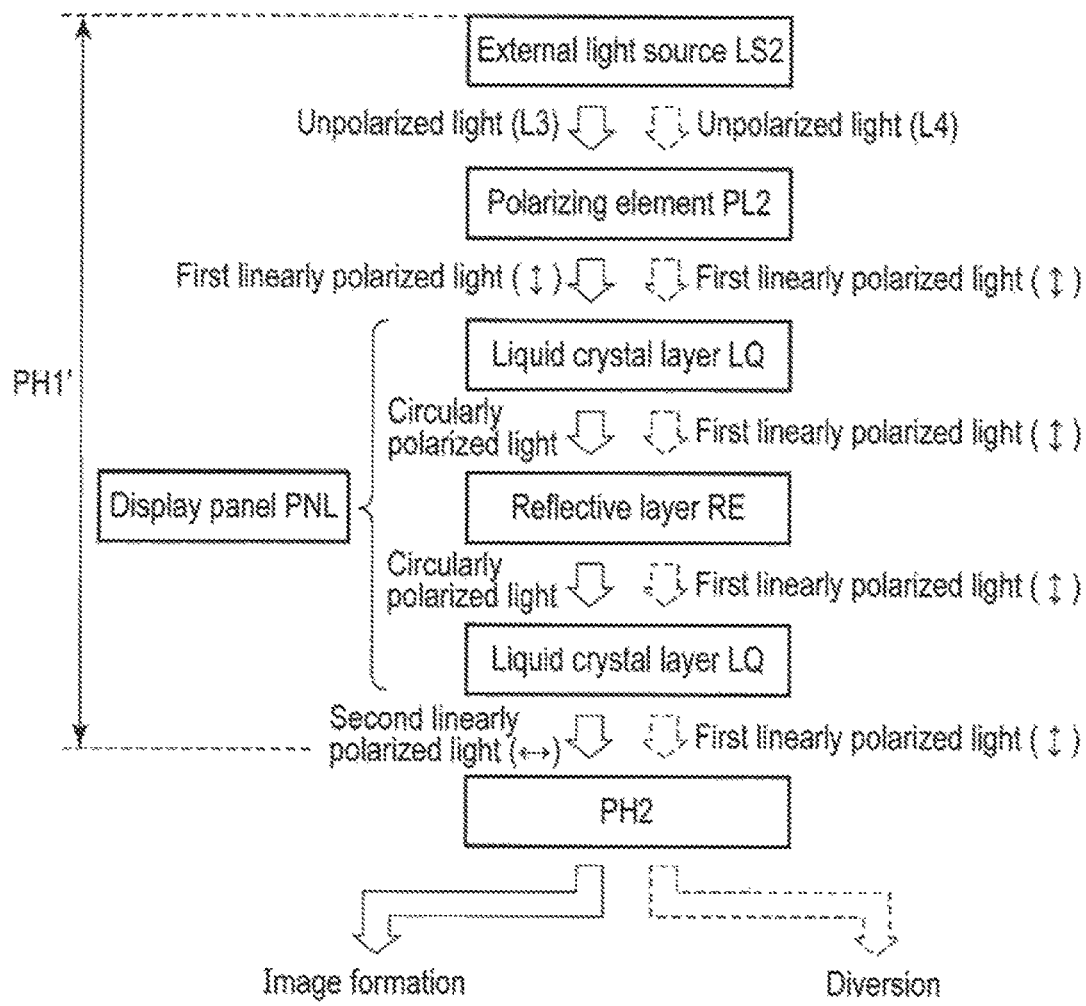
F I G. 9

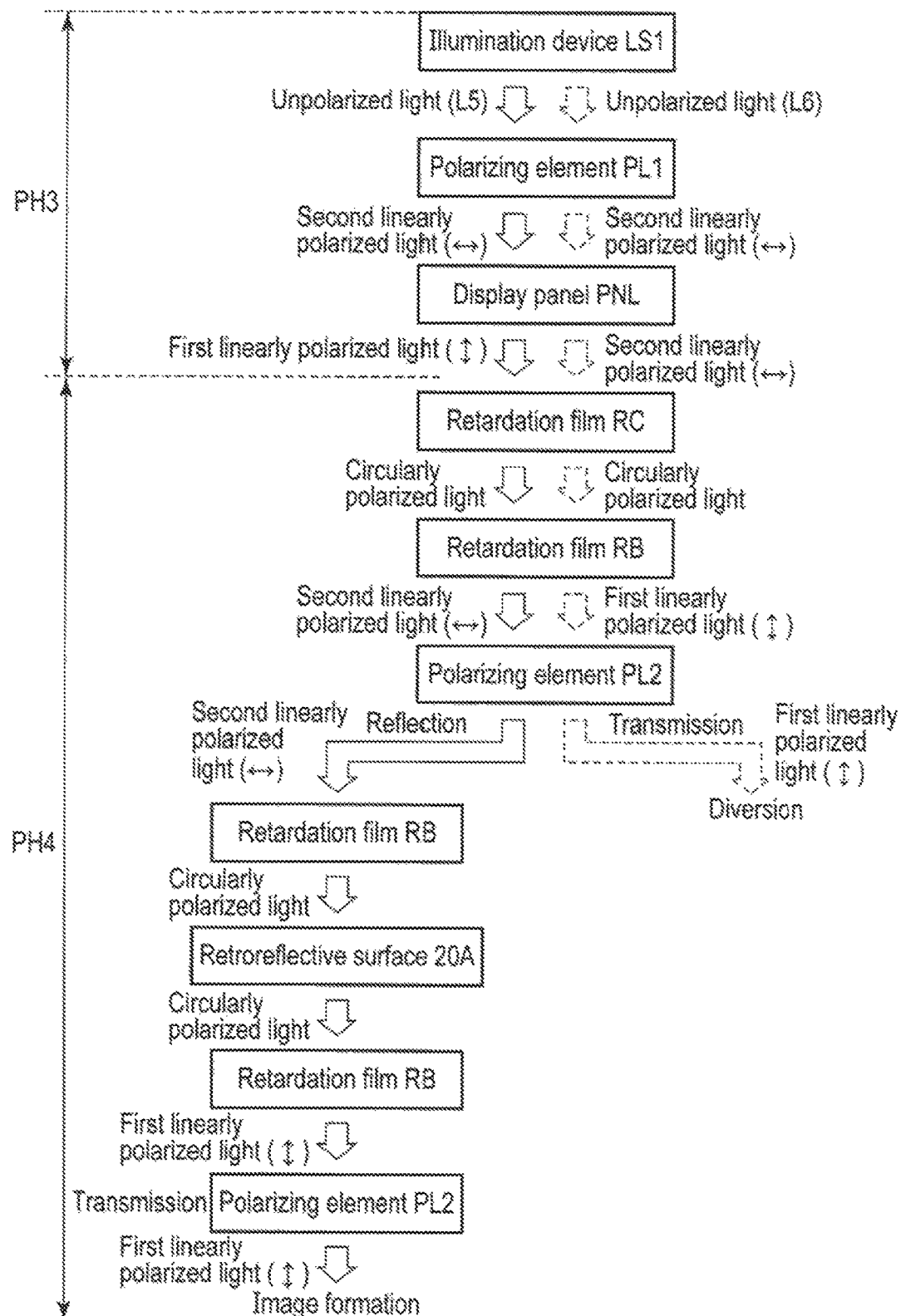
F I G. 11

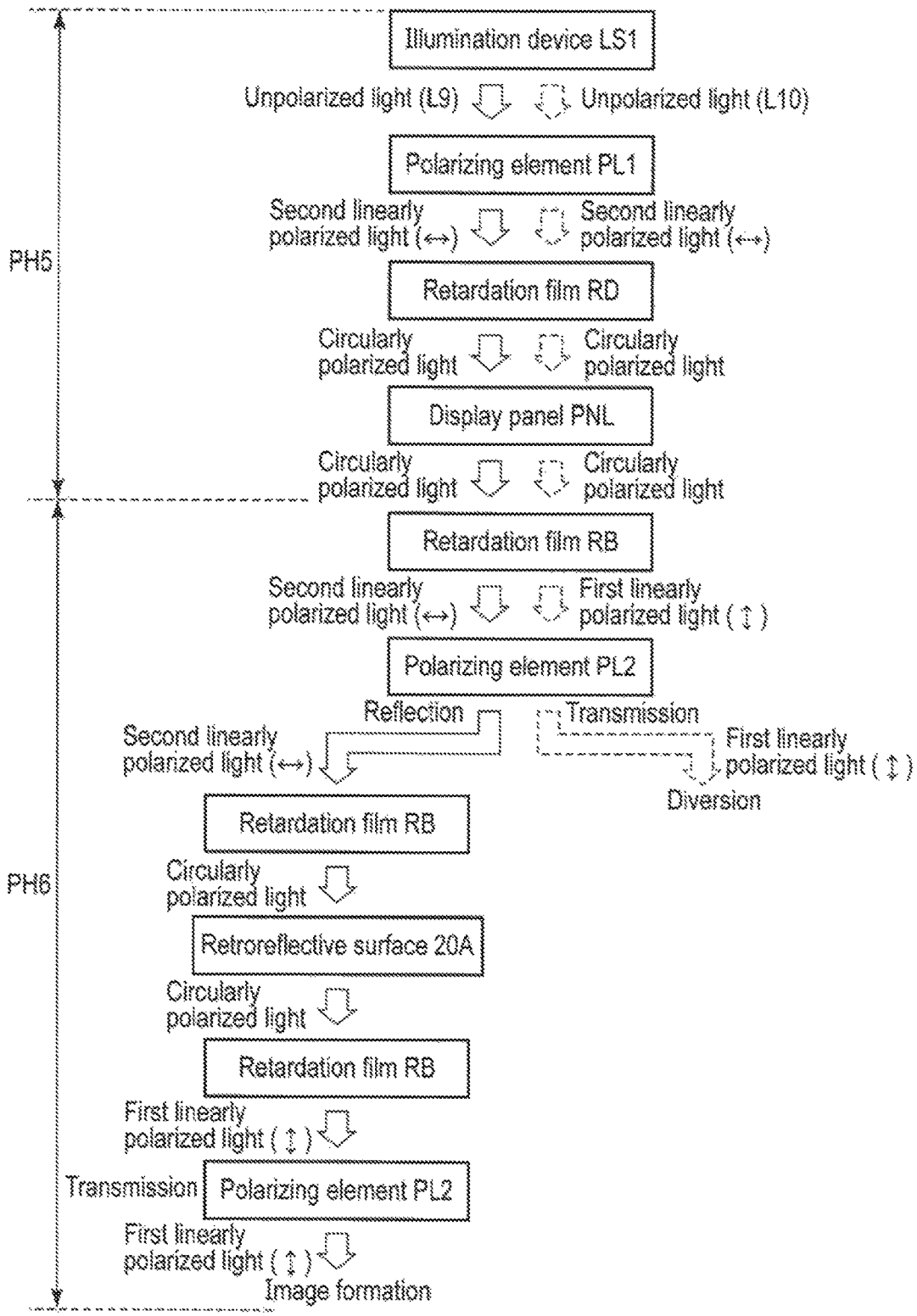
F I G. 14

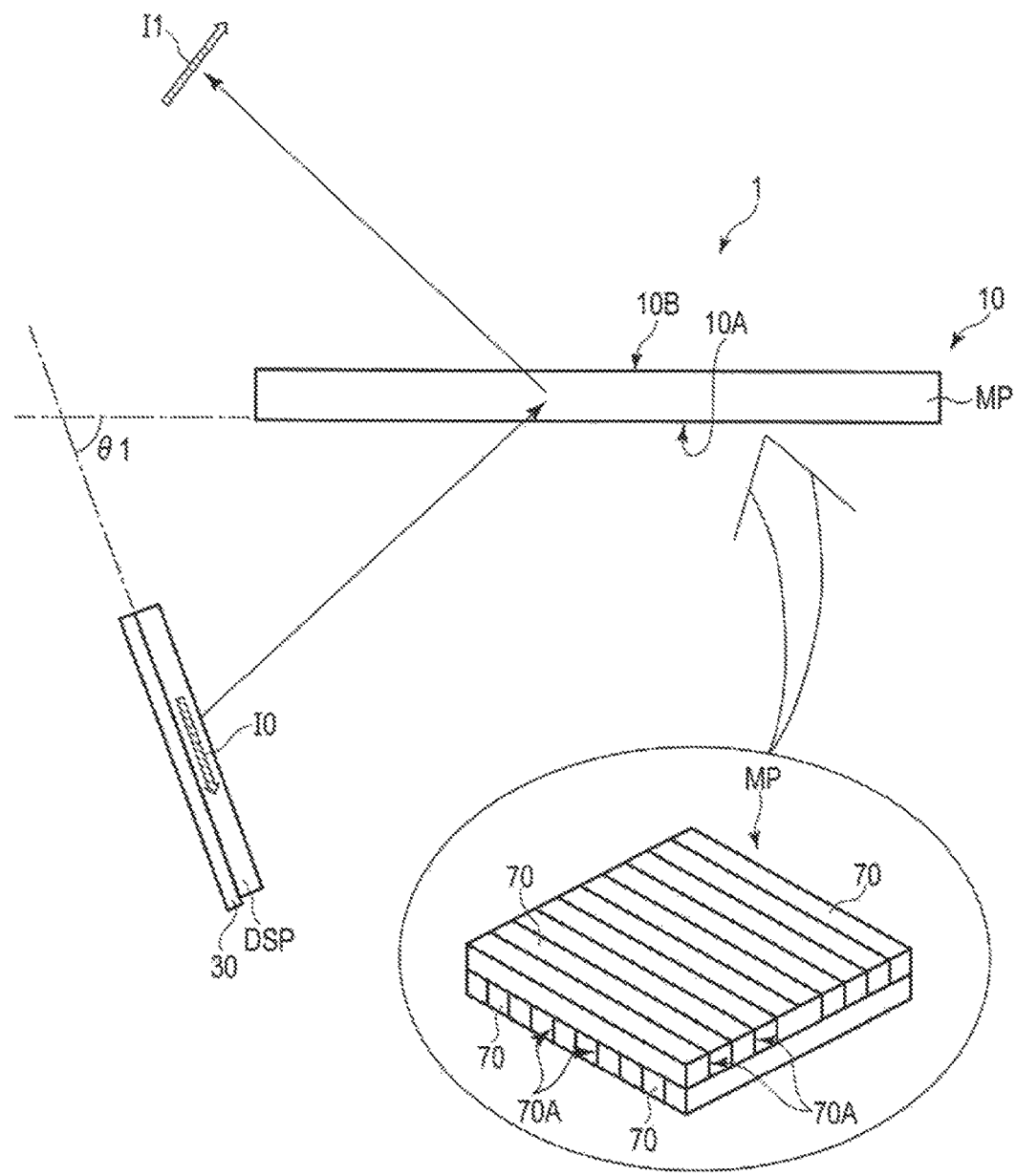
F I G. 20

DISPLAY DEVICE

CROSS-REFERENCE TO RELATED APPLICATIONS

This application is based upon and claims the benefit of priority from Japanese Patent Application No. 2016-149917, filed Jul. 29, 2016, the entire contents of which are incorporated herein by reference.

FIELD

Embodiments described herein relate generally to a display device.

BACKGROUND

As an aerial imaging display device which projects floating images in air, a structure comprising a retroreflective member has been proposed. For example, a structure comprising a polarizing filter which transmits polarized components parallel to a transmission axis and reflects polarized components perpendicular to the transmission axis, and a structure comprising a half mirror are studied. The former requires optical films such as a polarizing filter and a retardation film, whereas the latter entails a possible drawback that external light may enter the display device to reduce contrast.

BRIEF DESCRIPTION OF THE DRAWINGS

FIG. 9 is a flowchart indicating optical paths of light L3 and L4 in the display device 1 shown in FIG. 7.

FIG. 11 is a flowchart indicating optical paths of lights L5 and L6 in the display device 1 shown in FIG. 12 is a flowchart indicating optical paths of light L7 and L8 is the display device 1 shown in FIG. 10.

FIG. 14 is a flowchart indicating optical paths of light L9 and L10 in the display device 1 shown in FIG. 13.

FIG. 20 is a diagram showing a configuration example of the display device 1 according to a third embodiment.

DETAILED DESCRIPTION

Figure 1:
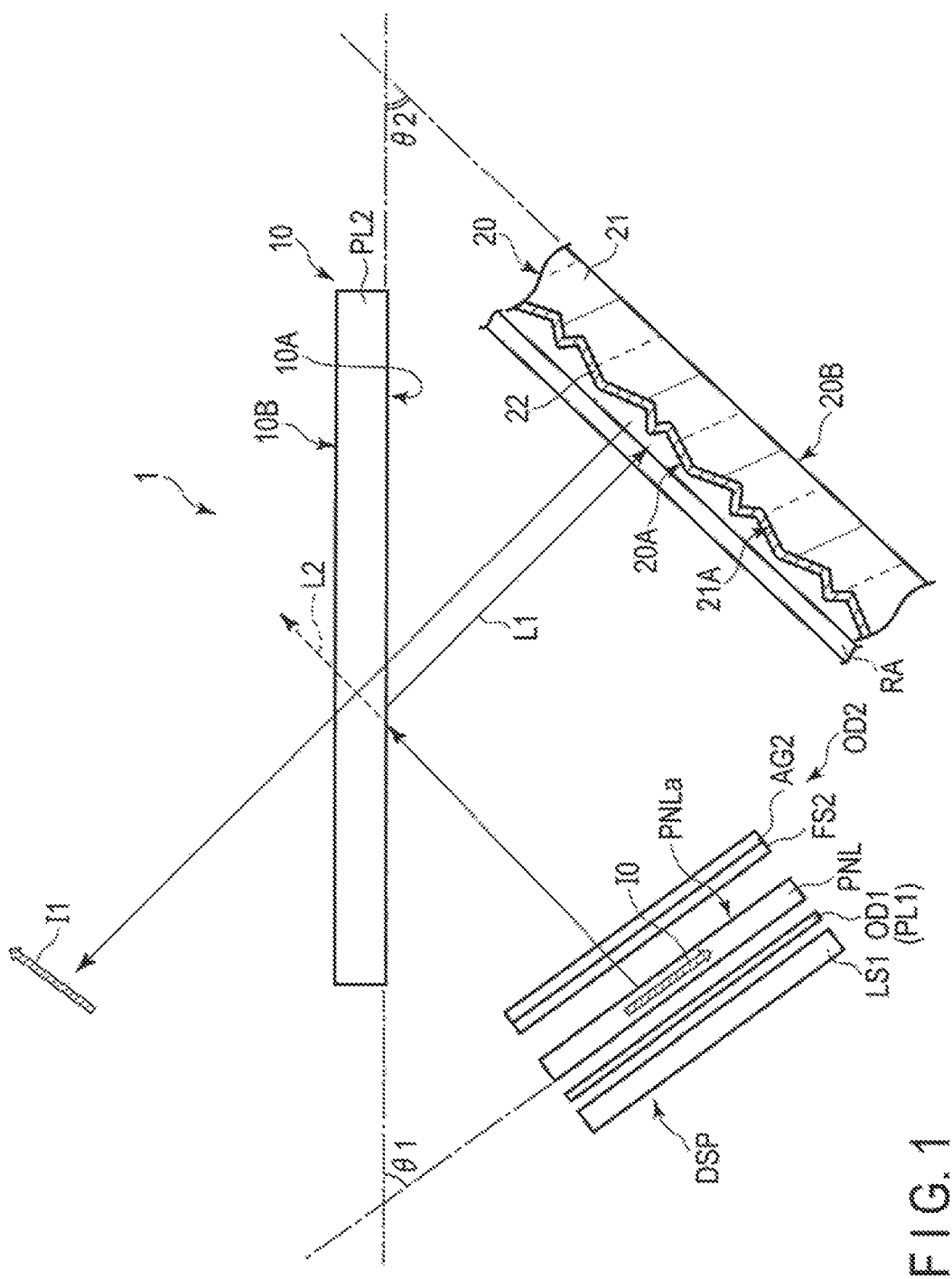
FIG. 1 is a diagram showing a configuration example of a display device 1 according to a first embodiment.

In general, according to one embodiment, a display device comprises an illumination unit, a polarizing element which transmits a specific polarized component of light entering from the illumination unit, a display panel which transmits the polarized light entering from the polarizing element while maintaining or converting a polarized state, an optical element comprising a transmission axis which transmits first linearly polarized light, which transmits or reflects the light entering from the display panel and a reflective element which retro-reflects the light reflected by the optical element, the display panel and the reflective element facing one surface of the optical element.

According to another embodiment, a display device comprises a reflector which reflects light, an optical element which transmits or reflects reflected light from the reflector and a reflective element which retroreflects the light reflected by the optical element, the reflector and the reflective element facing one surface of the optical element.

According to another embodiment, a display device comprises a reflector which reflects light and an optical element which reflects reflected light from the reflector, wherein the optical element reflects light entering from one side to a direction symmetrical to an incident direction on an other side with respect so the optical element an a plane of symmetry.

Embodiments will be described with reference to accompanying drawings. Note that the disclosure is presented for the sake of exemplification, and any modification and variation conceived within the scope and spirit of the invention by a person having ordinary skill in the art are naturally encompassed in the scope of invention of the present application. Further, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. In addition, in the specification and drawings, the structural elements, which have functions identical or similar to the functions described in connection with preceding drawings, are denoted by like reference numbers, and an overlapping detailed description thereof is omitted unless otherwise necessary.

[First Embodiment]

FIG. 1 is a diagram showing a configuration example of a display device 1 according to the first embodiment.

The display device 1 is an aerial imaging device which projects a display image I1 in the air. A display image I0 displayed on a display DSP corresponds to a real image of the display image I1. The display image I1 is formed at a position symmetrical to the display image I0 with respect to an optical element 10 as a plane of symmetry. The display device 1 comprises a display DSP, the optical element 10, a reflective element 20, a retardation film RA, etc.

The display DSP comprises an illumination device LS1, optical member OD1, a display panel PNL, an optical ember OD2, etc. As long as the illumination device LS1 can irradiates light to the display panel PNL, the structure thereof is not particularly limited. Although a detailed explanation is omitted, applicable examples of the illumination device LS1 are the so-called edge-light type backlight comprising a light emitting diode (LED) in an end of its light guide plate and the so-called direct type backlight comprising a LED directly under a diffusion plate. The light emitted from the illumination device LS1 may be unpolarized natural light or linearly polarized light passing the transmission axis of a polarizing element PL1.

The light element OD1 is disposed to oppose the illumination device LS1 and it comprises the polarizing element PL1. The polarizing element PL1 transmits a specific polarized component of the light entering from the illumination device LS1. For example, the polarizing element PL1 is an absorptive polarizer which absorbs polarized components normally crossing the transmission axis. The polarizing element PL1 may be a reflective polarizer which reflects polarized components normally crossing the transmission axis, or may be a multilayer member in which an absorptive polarizer and a reflective polarizer in stacked one on another.

The type of the display panel PNL is not particularly limited as long as it is an optical modulation element which maintains or changes polarized light entering from the polarizing element PL1 and transmits. In the example illustrated, a transmissive liquid crystal display panel is adopted, which changes the polarizing direction of transmitted light while controlling the alignment of the liquid crystal composition by application of voltage. The display panel PNL comprises a surface PNLa light on a side opposing the optical element 10 and the reflective element 20, and the light expressing the display image I0 is emitted from the surface PNLa. The display panel PNL is disposed parallel to the polarizing element PL1 and is located between an optical element OD1 (polarizing element PL1) and another optical element 10 (polarizing element PL2). For example, the display panel PNL, which is a liquid crystal display panel, holds a liquid crystal layer between a pair of substrates. A detailed explanation on the display panel PNL will be provided later. As will be described later, the display panel PNL may be a reflective type which reflects the light from an external light source while maintaining or changing its polarized state, or trans-reflective type having the functions of both the transmissive and reflective types.

The optical element OD2 is located between she display panel PNL and the optical element 10. In the example illustrated, the optical element OD2 is disposed parallel to the surface PNLa of the display panel PNL. For example, the optical element OD2 is adhered to the surface PNLa via a pressure-sensitive adhesive. The optical element OD2 comprises, for example, a scattering layer FS2, a reflection suppressing layer AG2, etc. But, the optical element OD2 does not comprise a polarizing element, and the light entering the optical element OD2 passes the optical element OD2 while substantially maintaining its polarizing direction. Note that the display DSP may be configured without comprising the optical element OD2.

As long as it can scatter transmission light, the structure of the scattering layer FS2 is not particularly limited. The scattering layer FS2 is, for example, an anisotropic scattering layer or an isotropic scattering layer.

An anisotropic scatter layer can scatter incident light from a specific direction and, for example, scatters light entering the optical element OD2 from a display panel PNL side and transmits light entering the optical element OD2 from an opposite side to that where the display panel PNL is located, without substantially scattering the light. An anisotropic scattering layer is a member which has, for example, a louver structure construction in which tabular members having refractive indexes different from each other are arranged, or a pillar structure in which cylindrical members are arranged in supporters having refractive indexes different from each other. The anisotropic scatter layer should preferably have a plurality of sheets stacked one on another in order to, for example, expand the scattering range and prevent rainbow color.

An isotropic scattering layer can scatter light entering from any direction and, for example, scatters light entering the optical element OD2 from the display panel PNL, and scatters also light entering the optical element OD2 from an opposite side to that which the display panel PNL is located. The isotropic scattering layer is a light-scatterable adhesive in which, for example, a number of fine particles are diffused in a resin composite having a refractive index different from that of the fine particles. The scattering layer FS2 scatters the light emitted from the surface PNLa of the display panel PNL to expand the angular range (viewing angle) in which the display image I1 is viewable. Thus, the visibility of the display image I1 can be improved.

As long as it can suppress the reflection of incident light, the structure of the reflection suppressing layer AG2 is not particularly limited and, for example, comprises a dielectric multilayer in which layers having dielectric constants different from each other stacked one on another, or a resin film comprising a surface on which fine projections and recesses are formed. The reflection suppressing layer AG2 suppresses reflection of the light entering the optical element OD2 from the optical element 10 or the reflective element 20. Therefore, when comprising the reflection suppressing layer AG2, the display device 1 can suppress stray light in the display device 1, and therefore it can suppress the rise in the peripheral brightness of the display image I1, which may be caused by the light not contributing to the image formation of the display image I1 being emitted from the display device 1.

The optical element 10 transmits or reflects the light entering from the display panel PNL. The optical element 10 comprises outer surface 10B are located in a display image I1 side and an inner surface 10A located on an opposite side to the outer surface 10B. The inner surface 10A opposes the display panel PNL and the reflective element 20. The optical element 10 comprises a polarizing element PL2. In the example illustrated, the main surface located on a side opposing the surface PNLa of the polarizing element PL2 and the retroreflective surface 20A corresponds to the inner surface 10A.

In the example illustrated, the polarizing element PL2 is a reflective polarizer comprising a transmission axis which transmits the first linearly polarized light, which reflects the second linearly polarized light normally crossing the transmission axis. For example, the first linearly polarized light is P wave parallel to the light-entering surface, whereas the second linearly polarized light is an S wave perpendicular to the light-entering surface. The polarizing element PL2 is formed from, for example, a wire-grid polarizing filter, a reflective polarizing film to which a brightness enhancement film is applied, or a multilayered member in which this reflective polarizing film and an absorptive polarizer are stacked one on another. When the polarizing element PL2 is a multilayered member such as that described above, the absorptive polarizer is disposed on a reflective polarizing film (that is, an opposite side to that opposing the display DSP and the reflective element 20) and further has a transmission axis parallel to a transmission axis of the reflective polarizing film. When the polarizing element PL2 comprises an absorptive polarizer, the reflection of the external light entering the polarizing element PL2 from the opposite side to the side opposing the display DSP can be suppressed, thereby making it possible to suppress the degradation of display quality. Moreover, when the polarizing element PL2 comprises an absorptive polarizer of a polarization degree higher than that of the reflective polarizer, the contrast of the display image I1 can be improved.

The reflective element 20 retro-reflect the light reflected by the optical element 10. The reflective element 20 comprises a retroreflective surface 20A on a side opposing the display DSP and the optical element 10. The retroreflective surface 20A an uneven surface with projections and recesses, which retro-reflects the entering light. The reflective element 20 comprises a basement 21 and a metal thin film 22. The basement 21 is formed from, for example, a resin material. In the example illustrated, a surface 21A of the basement 21 is as uneven surface modeled after the retroreflective surface 20A. In the example illustrated, a rear surface 20B of the reflective element 20 (the rear surface of the basement 21 in the example illustrated) is a flat surface. The metal thin film 22 is formed by vapor deposition, for example, and covers the surface 21A of the basement 21. The metal thin film 22 has substantially a uniform thickness in its entirety. The metal thin film 22 is formed of a material exhibits light reflectivity, such as silver (Ag), aluminum (Al), or an aluminum alloy.

In the example illustrated, the metal thin film 22 forms the retroreflective surface 20A. That is, in the example illustrated, the reflective element 20 comprises an uneven surface corresponding to the retroreflective surface 20A on an inner side of the display device 1 in which various optical elements including the retardation film are arranged, and a flat surface corresponding to the rear surface 20B on an outer side of the display device 1. Note that the metal thin film 22 may be subjected to a surface treatment to prevent the corrosion sad damage. Further, the metal thin film 22 may be coated with an inorganic material such as silicon nitride (SiN) or an organic material such as a light-transmissive resin. In this case, the reflective element 20 may comprise a flat surface even in a region corresponding to the retroreflective surface 20A, on the inner side of the display device 1.

When the basement 21 is formed of a material which exhibits light-reflectivity, it may be the surface 21A of the basement 21 that forms the retroreflective surface 20A. In this case, the manufacturing process can omit the step of forming a layer having light-reflectivity, such as a metal thin film.

In the retroreflective surface 20A, the transmissivity of the light entering the reflective element 20 from the optical element 10 is substantially zero, and most the incidence light entering the retroreflective surface 20A does not reach the rear surface 20B of the reflective element 20. Therefore, according to this configuration example, it is possible to suppress the generation of the ghost caused by light reflection in the rear surface 20B.

Note that the reflective element 20 may comprise the basement 21 on the inner side the display device 1, and the metal thin film 22 on the outer side of the display device 1. In this case, the reflective element 20 has a flat surface (rear surface 20B) on the inner side the display device 1, and also an uneven surface corresponding to the retroreflective surface 20A on the outer side of the display device 1.

When the basement 21 is located adjacent to a material having a different refractive index on the surface 21A (that is, for example, air layer), the reflective element 20 need not to comprise the metal thin film 22. In this case, the light entering the reflective element 20 retro-reflects by the interface reflection in the surface 21A of the basement 21; therefore, the surface 21A corresponds to the retroreflective surface 20A.

In the example illustrated, the retardation film RA is disposed on a side opposing the optical element 10 of the reflective element 20. The retardation film RA set substantially parallel to the rear surface 20B, for example. The retardation film RA is, for example, a $\frac{1}{4}\lambda$ plate which imparts a phase difference of approximately $\frac{1}{4}\lambda$ to transmitting light. Here, $\lambda$ is the wavelength of the transmitting light. The retardation film RA may be a multilayered member of several retardation films having different phase difference value or different wavelength dispersion properties. For example, the retardation film RA may be formed by combining a $\frac{1}{2}\lambda$ plate and a $\frac{1}{4}\lambda$ plate together to reduce the wavelength dependence. Although a detailed explanation is omitted, the retardation film RA is arranged so that its slow axis crosses the polarization plane of the linearly polarized light which enters the retardation film RA at an angle of 45°. With this arrangement, the linearly polarized light is converted into circularly polarized light and the circularly polarized light is changed into linearly polarized light when passing through the retardation film RA. Note that the term "circularly polarized light" used here includes elliptically polarized light as well.

As will be described later in this configuration example, or modifications, at least, one retardation film, which imparts a phase difference of approximately $\frac{1}{4}\lambda$ to transmitting light, is provided between the optical element 10 and the reflective element 20. More specifically, an odd number of $\frac{1}{4}\lambda$ plates are provided on an optical path up to the point where the light reflected by the optical element 10 enters the reflective element 20. According to such structure, the first linearly polarized light reflected by the optical element 10 is retro-reflected by the reflective element 20 and therefore when the light once again enters the optical element 10, it is already converted into the second linearly polarized light. Further, no $\frac{1}{4}\lambda$ plate is provided on the optical paths from the polarizing element PL1 to the polarizing element PL2. Or an even number of $\frac{1}{4}\lambda$ plates are provided on the optical paths from the polarizing element PL1 to the polarizing element PL2. According to such structure, the light converted into circularly polarized light after passing through the polarizing element PL1 is already converted into linearly polarized light when entering the polarizing element PL2, and thus the polarizing element PL2 can be used to function as s polarizing filter. Retardation films RB, RC and RD employed in modifications which will be explained later also correspond to such a $\frac{1}{4}\lambda$ plate.

The optical element 10 is disposed at an angle $\theta 1$ with respect to the display panel PNL. The angle $\theta 1$ is equivalent to an angle made by, for example, the surface PNLa of the display panel PNL and the inner surface 10A of the polarizing element PL2. That is, the polarizing element PL2 is arranged to be inclined with respect to the polarizing element PL1 and the display panel PNL. The reflective element 20 is disposed at angle $\theta 2$ with respect to the optical element 10. The angle $\theta 2$ is equivalent to an angle made by, for example, the rear surface 20B of the reflective element 20 and the inner surface 10A of the polarizing element PL2.

That is, the retardation film RA is arranged to be inclined with respect to the polarizing element PL2.

The angle θ1 is not particularly limited as long as the light emitted from the display DSP thereby can enter the optical element 10. For example, the angle θ1 is set as an acute angle greater than 0° and less than 90°. When the angle θ1 is less than 45°, the light emitted from the display DSP can be efficiently allowed to enter the optical element 10. On the other hand, if the angle θ1 is large, the reflection of the light reflected by the display DSP and diverging without contributing to image formation of the display image I1 (, which is equivalent to light L4 explained later) towards the direction where the display image I1 is located can be suppressed, thereby making it possible to suppress the increase in peripheral brightness of the display image I1. In the light of the viewpoint above, the angle θ1 should preferably be set, for example, 45° or greater. As long as it can allow the light reflected by the optical element 10 to enter the retroreflective surface 20A, the angle θ2 is not particularly limited. But, in terms of the efficiency of the retro-reflection in the retroreflective surface 20A, the angle θ2 should preferably be set 45° greater but 135° or less.

Next, an active matrix driving transmissive liquid crystal display panel will be described with reference to FIGS. 2 and 3 as an example of the display panel PNL shown in FIG. 1.

Figure 2:
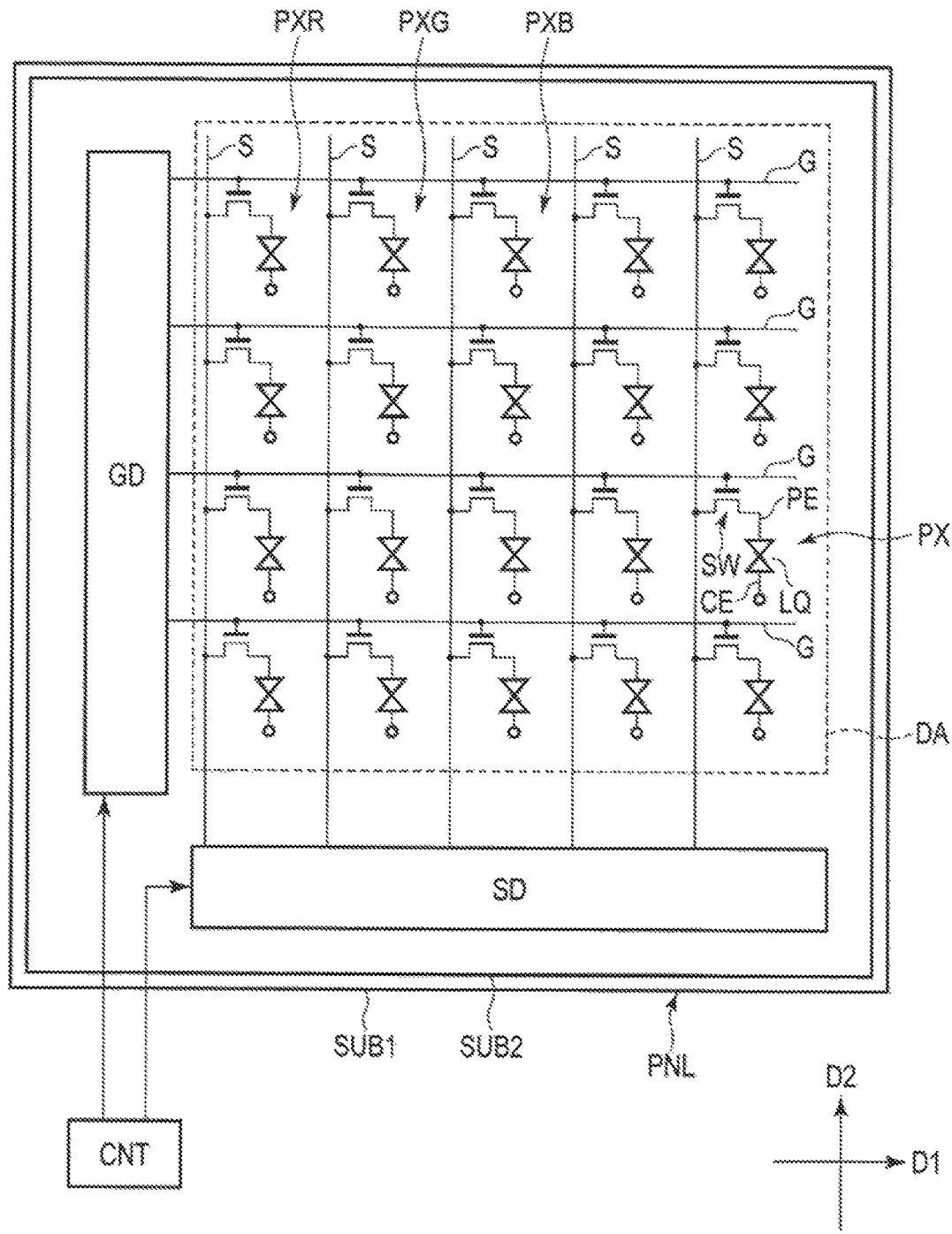
FIG. 2 is a diagram showing a configuration example of a display panel PNL shown in FIG. 1.

FIG. 2 is a diagram showing a configuration example of the display panel PNL shown in FIG. 1.

In the example illustrated, the display panel PNL comprises ends extending along a first direction D1 and a second direction D2. The first direction D1 and the second direction D2 cross each other, and in the example illustrated, they cross at right angles.

The display panel PNL comprises a first substrate SUB1, a second substrate SUB2 disposed to oppose the first substrate SUB1 and a liquid crystal layer LQ held between the first substrate SUB1 and the second substrate SUB2. The first substrate SUB1 and the second substrate SUB2 are attached together while a predetermined cell gap is formed therebetween. The display panel PNL includes a display area DA to display images. The display area DA includes sub-pixels PX arrayed in a matrix.

The display area DA includes, as sub-pixels PX, for example, red pixels PXR which display red, green pixels PXG which display green and blue pixels PXB which display blue. The display area DA may further comprise sub pixels of colors different color from red, green or blue (that is, for example, white pixels which display white). Each pixel comprises the sub-pixels PX of the different colors to implement the color display. That is, the pixel is a minimum unit to form a color image. In the example illustrated, the pixel comprises a red pixel PXR, green pixel PXG and a blue pixel PXB.

The red pixel PXR includes a red color filter and is formed to transmit red light mainly, of the white light from the light source device. The green pixel PXG includes a green color filter and is formed to transmit green light mainly, of the white light from the light source device. The blue pixel PXB includes a blue color filter and is formed to transmit blue light mainly, of the white light from the light source device. The color filters may be formed on the first substrate SUB1 or the second substrate SUB2 though not explained in detail.

The first substrate SUB1 comprises a plurality of gate lines G extending along the first direction D1 and a plurality of source lines S extending along the second direction D2 and crossing the gate lines G. Each of the gate lines G is drawn out from the display area DA and is connected to a gate driver GD. Each of the source lines S is drawn out from the display area DA and is connected to a source driver SD. The gate driver GD and the source driver SD are connected to a controller CNT. The controller CNT generates control signals, baaed on a video signal, to control the gate driver GD and the source driver SD.

Each of the sub-pixels PX includes a switching element SW, a pixel electrode PE, a common electrode CE and the like. The switching element SW is electrically connected to a data line G and a source line S. The switching element SW is formed from, for example, a thin film transistor. The pixel electrode PE is electrically connected to the switching element SW. The common electrode CE opposes the pixel electrodes PE.

Though a detailed explanation on the structure of the display panel PNL will be omitted, in a display mode using a vertical electric field along the normal of the main surface of the substrate or in a display mode using an inclined electric field inclined along an oblique direction to the normal of the main surface of the substrate, the pixel electrodes PE are provided in the first substrate SUB1, whereas the common electrode CE is provided in the second substrate SUB2. In a display mode using a lateral electric field along the main surface of the substrate, both of the pixel electrodes PE and the common electrode CE are provided in the first substrate SUB1. Further, the display panel PNL may be configured to be provided for a display mode using a necessary combination of any of the above-mentioned vertical, lateral and inclination electric fields. In the example illustrated, the main surface of the substrate corresponds to a plane defined by the first direction D1 and the second direction D2.

Figure 3:
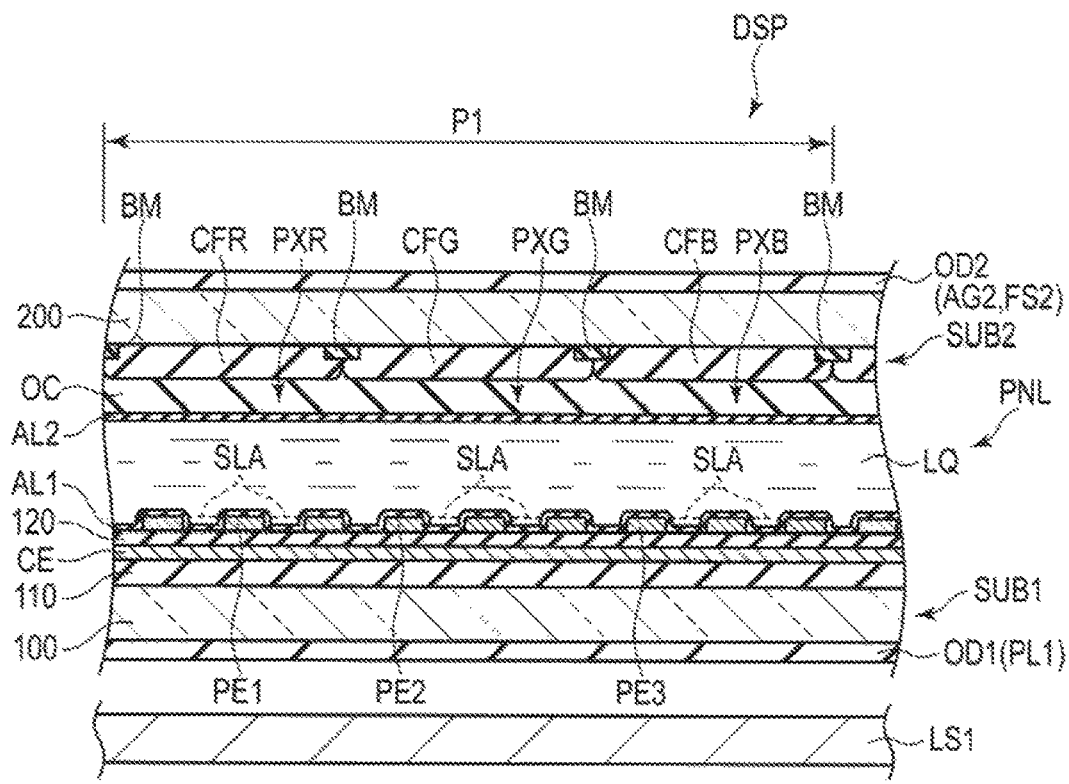
FIG. 3 is a cross section showing one configuration example of the display panel PNL shown in FIG. 2.

FIG. 3 is a cross section showing a configuration example of the display panel PNL shown in FIG. 2.

Here, a cross-sectional structure of the display panel PNL will be described briefly, to which a fringe field switching (FFS) mode, which is one of the display modes using a lateral electric field is applied.

The first substrate SUB1 comprises a first insulating substrate 100, a first insulating film 110, a common electrode CE, a second insulating film 120, a pixel electrodes PE1 to PE3, a first alignment film AL1, etc. The common electrode CE opposes the liquid crystal layer LQ and extends over from the red pixel PXR, the green pixel PXG and the blue pixel PXB. A pixel electrode PE1 of the red pixel PXR, a pixel electrode PE2 of the green pixel PXG and a pixel electrode PE3 of the blue pixel PXB each oppose the common electrode CE and comprises silts SLA. In the example illustrated, the common electrode CE is located between the first insulating film 110 and the second insulating film 120, and the pixel electrodes PE1 to PE3 are located between the second insulating film 120 end the first alignment film AL1. Note that the pixel electrodes PE1 to PE3 may be located between the first insulating film 110 and the second insulating film 120, and the common electrode CE may be located between the second insulating film 120 and the first alignment film AL1. In this case, the slits SLA are formed in the common electrode CE. The pixel electrodes PE1 to PE3 and the common electrode CE have light transmissivity and are formed from, for example, a transparent conductive materials such as indium tin oxide (ITO) or indium zinc oxide (IZO).

The second substrate SUB2 comprises a second insulating substrate 200, a light-shielding layer BM, color filters CFR, CFG and CFB, an overcoat layer OC, a second alignment film AL2 etc. The first insulating substrate 100 and the second insulating substrate 200 have light transmissivity and are formed from, for example, a glass or resin substrate. The color filters CFR, CFG and CFB each opposes the liquid crystal layer LQ and also they oppose the pixel electrodes PE1 to PE3, respectively, while interposing the liquid crystal layer LQ therebetween. The color filter CFR is a red color filter, the color filter CFG is a green color filter, and the color filter CFB is a blue color filter. In the example illustrated, the color filter CFR, CFG and CFB are formed in the second substrate SUB2, but they may be formed in the first substrate SUB1.

The liquid crystal layer LQ is sealed in between the first alignment film AL1 and the second alignment film AL2. The illumination device LS1 opposes the first substrate SUB1. The optical element OD1 containing the polarizing plate element PL1 is disposed on an outer surface of the first insulating substrate 100. The optical element OD2 containing the reflection suppressing layer AG2 is disposed on an outer surface of the second insulating substrate 200. For example, the optical elements OD1 and OD2 are attached to the first and second insulating substrates 100 and 200, respectively, with a pressure sensitive adhesive.

The pixels each comprising a red pixel PXR, a green pixel PXG and a blue pixel PXB are arranged at a pitch P1.

Figure 4:
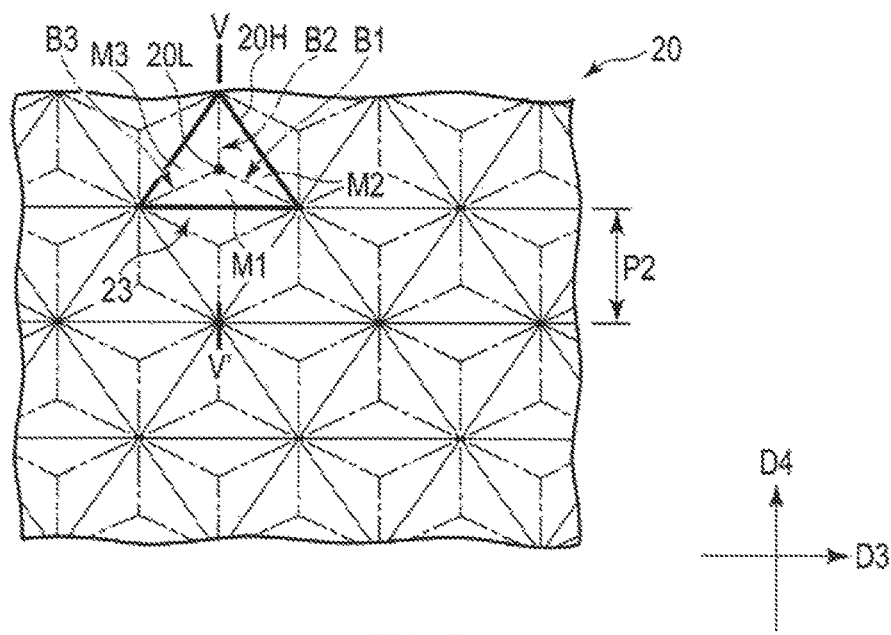
FIG. 4 is a plan view showing a configuration example of a reflective element 20.

FIG. 4 is a plan view showing a configuration example of the reflective element 20. This figure shows the retroreflective surface 20A is planar view. The retroreflective surface 20A expands on a D3-D4 plane defined by a third direction D3 and fourth direction D4 crossing each other. In the example illustrated, the third direction D3 and the fourth direction D4 cross at right angles.

The reflective element 20 comprises a plurality of reflectors 23. In the plan view provided, the reflectors 23 are each formed into an equilateral triangle. Three sides surrounding a region corresponding to each reflector 23 are located at an apex 20H, and the center of the reflector 23 is located at a bottom 20L. The reflector 23 recesses in the bottom 20L towards the back of the illustration and comprises three reflective surfaces M1 to M3 expanding radially from the bottom 20L. The reflective surfaces M1 to M3 are each located in a triangular region defined by connecting one side of the apexes 20H extending in different directions and the respective bottom 20L.

The reflective surfaces M1 to M3 are all identical in shape, and adjacent to each other. For example, the reflective surfaces M1 and M2 are adjacent to each other on a boundary B1 and are symmetrical to each other with respect to the boundary B1. The reflective surfaces M2 and M3 are adjacent to each other by a boundary B2 extending along the fourth direction D4, and are symmetrical to each other with respect to the boundary B2. The reflective surfaces M3 and M1 are adjacent to each other on a boundary B3, and are symmetrical to each other with respect to the boundary B3. The reflective surfaces M1 to M3 meet on a corner portion at the bottom 20L at right angles with respect to each other. These reflective surfaces M1 to M3 are orthogonal to each other. The retroreflective surface 20A constituted by the reflective surfaces M1 to M3 of such a shape is called a corner cube or a corner reflector. An inner side surrounded by the three reflective surfaces M1 to M3 is provided with an air layer or a protecting member which protects the reflective surfaces M1 to M3. In each reflector 23, the entering light is reflected by the three reflective surfaces M1 to M3, thereby realizing the retro-reflection, which reflects the entering light to substantially the same optical path.

In the example illustrated, some of the reflectors 23 are arranged along the third direction D3, and others of the reflectors 23 are arranged at a pitch P2 along the fourth direction D4. Each adjacent pair of reflectors 23 located along the third direction D3 or the fourth direction D4 are inverted by 180° with respect to each other.

The resolution of the display image I1 is dependent on the pitch P2 of the reflectors 23. to order to suppress degradation of the resolution, the pitch P2 should desirably be less than the pitch P1 of the pixels in the display panel PNL shown in FIG. 3.

Figure 5:
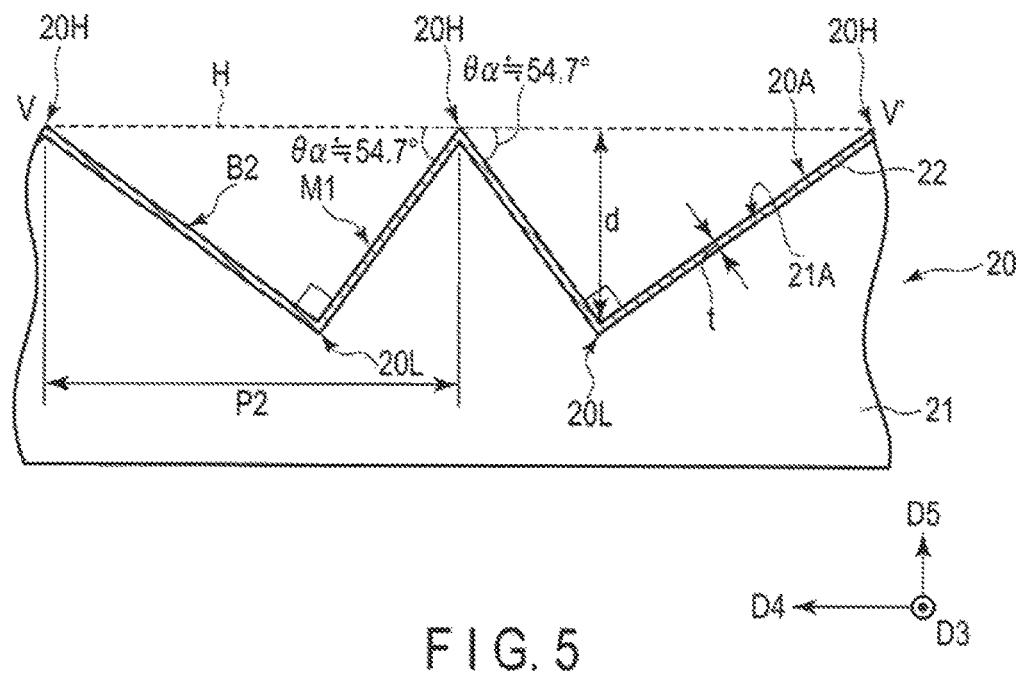
FIG. 5 is a cross section a showing an example of a cross-sectional structure of the reflective element 20 taken along line V-V' shown in FIG. 4.

FIG. 5 is a diagram showing an example of a cross-sectional structure of the reflective element 20 taken along line V-V' line in FIG. 4.

In the example illustrated, the apexes 20H are located on an inner side of the display device 1 in relation to the bottoms 20L, respectively. Each corner reflector formed by the reflective surfaces M1 to M3 of the retroreflective surface 20A recesses with respect to a horizontal surface (surface parallel to a D3-D4 plane) H indicated by a dashed line in the drawing. The horizontal surface H is a surface containing the apexes 20H. The bottoms 20L are located on a side closer to the rear surface 20B than to the horizontal surface H. Note that if the basement 21 is configured to be located on the inner side of the display device 1, it can be interpreted that the corner reflector projects with respect to the horizontal surface H. In such a case, the bottoms 20L are located on the inner side of the display device 1 with respect to the apexes 20H. The cross section formed by the horizontal surface H and the retroreflective surface 20A is a right triangle. The angle made by the reflective surface M1 and the boundary B2 is 90° and the horizontal surface H corresponds to an oblique side. A angle $\theta\alpha$ made by the reflective surface M1 and the horizontal surface H is about 54.7°.

For example, when the pitch P1 of the pixels in the display panel PNL is 200 μm, the pitch P2 of the retroreflectors in the reflective element 20 is 180 μm. Thus the pitch P2 is less than the pitch P1. Further, the retroreflective surface 20A has a depth d along a fifth direction D5 corresponding to the normal direction of the horizontal surface H. The depth d is, for example, 73.5 μm. The metal thin film 22 has a uniform thickness in the entire retroreflective surface 20A, which is sufficiently less as compared to the depth d, and for example, is 150 nm. Therefore, when the metal thin film 22 is formed, the surface 21A of the basement 21, modeled after the retroreflective surface 20A is buried under the metal thin film 22, or the retroreflective surface 20A is not destroyed.

Figure 6:
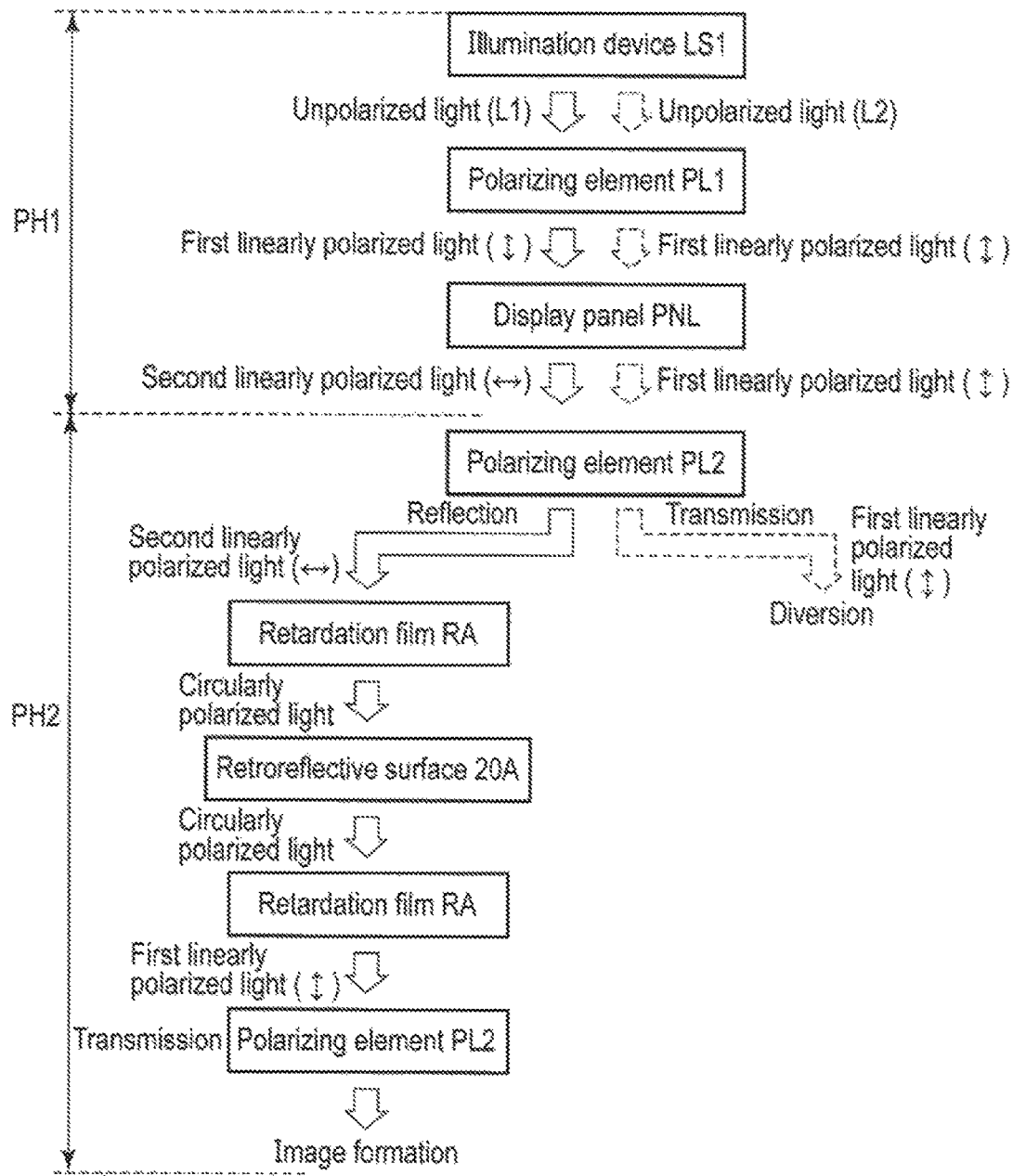
FIG. 6 is a flowchart indicating optical paths of light L1 and L2 in the display device 1 shown in FIG. 1.

FIG. 6 is a flowchart illustrating shows the optical paths of light L1 and light L2 in the display device 1 shown in FIG. 1.

An example of the behavior of the light emitted from the illumination device LS1 will be described. The light L1 and light L2 are light passing through the display panel PNL. The light L1 contributes to image formation of the display image I1 and the light L2 is that diverges.

The behaviors of the light L1 and L2 from the point where having passed the display panel PNL to the point immediately before entering the polarizing element PL2 will be described as a first stage PH1 and those after passing through the display panel PNL will be described as a second stage PH2, which will now be provided in this order.

In the first stage PH1, at the beginning, unpolarized light L1 and L2 are emitted from the illumination device LS1. The unpolarized light L1 and L2 pass through the polarizing element PL1 and are converted into the first linearly polarized light. Next, while the light L1 passing through the display panel PNL, it is converted into the second linearly polarized light. On the other hand, the light L2 passes through the display panel PNL while maintaining itself as the first linearly polarized light.

In the second stage PH2, the light L1, which is now the second linearly polarized light, emitted from the display panel PNL is reflected by the polarizing element PL2 and converted into circularly polarized light while passing through the retardation film RA. Next, the light L1, which is now circularly polarized light, is retro-reflected by the retroreflective surface 20A, and is converted into first linearly polarized light while passing through the retardation film RA again. Then, the light L1, which is now the first linearly polarized light, passes through the polarizing element PL2, and forms the display image I1. On the other hand, the light L2, which is now the first linearly polarized light, emitted from the display panel PNL passes through the polarizing element PL2 to diverge to the outside of the display device 1.

According to this configuration example, the display device 1 comprises display DSP including the polarizing element PL1 and the display panel PNL, and the optical element 10 including the polarizing element PL2. The linearly polarized light emitted from the display panel PNL passes through or is reflected by the optical element 10, which corresponds to a polarizing filter. Therefore, the display device 1 can form the display image I1 even without providing a polarizing filter, which makes a pair with the polarizing element PL1, on the optical element OD2. Thus, the number of components of the display DSP can be reduced, and accordingly, the manufacturing cost of the display device 1 can be lowered.

In this configuration example, the retardation film RA is disposed on a side opposing the optical element 10 of the reflective element 20. With this structure, the light L1 reflected by the optical element 10 is converted to change its polarization direction and passes through the optical element 10 after reflected by the retroreflective surface 20A, to contribute to the formation of the display image I1. Moreover, even if external light enters the display device 1 from the outside (opposite side to that opposing the display DSP of the optical element 10 and the reflective element 20) of the display device 1, the external light passing through the optimal element 10 and then reflected by the retroreflective surface 20A is reflected by the optical element 10. Therefore, the increase in the peripheral brightness of the display image I1 can be suppressed. Thus, the reduction in the relative brightness of the display image I1 can be suppressed, and the degradation of the display quality can be suppressed.

As described above, this embodiment can provide a display device whose manufacturing cost can be lowered and degradation of display quality can be suppressed.

[First Modification]

Next, a configuration which can utilize external light source LS2 for the formation of the display image I1 will be described with reference to FIGS. 7 to 9. The external light source LS2 is an environmental light source present outside the display device 1 or an auxiliary light source provided for the display device 1, that is, for example, interior illumination and sunlight. In this modification, both the light emitted from the illumination device LS1 and having passed through the display panel PNL and the light entering from the external light source LS2 and reflected by the display panel PNL contribute to the formation of she display image I1.

Figure 7:
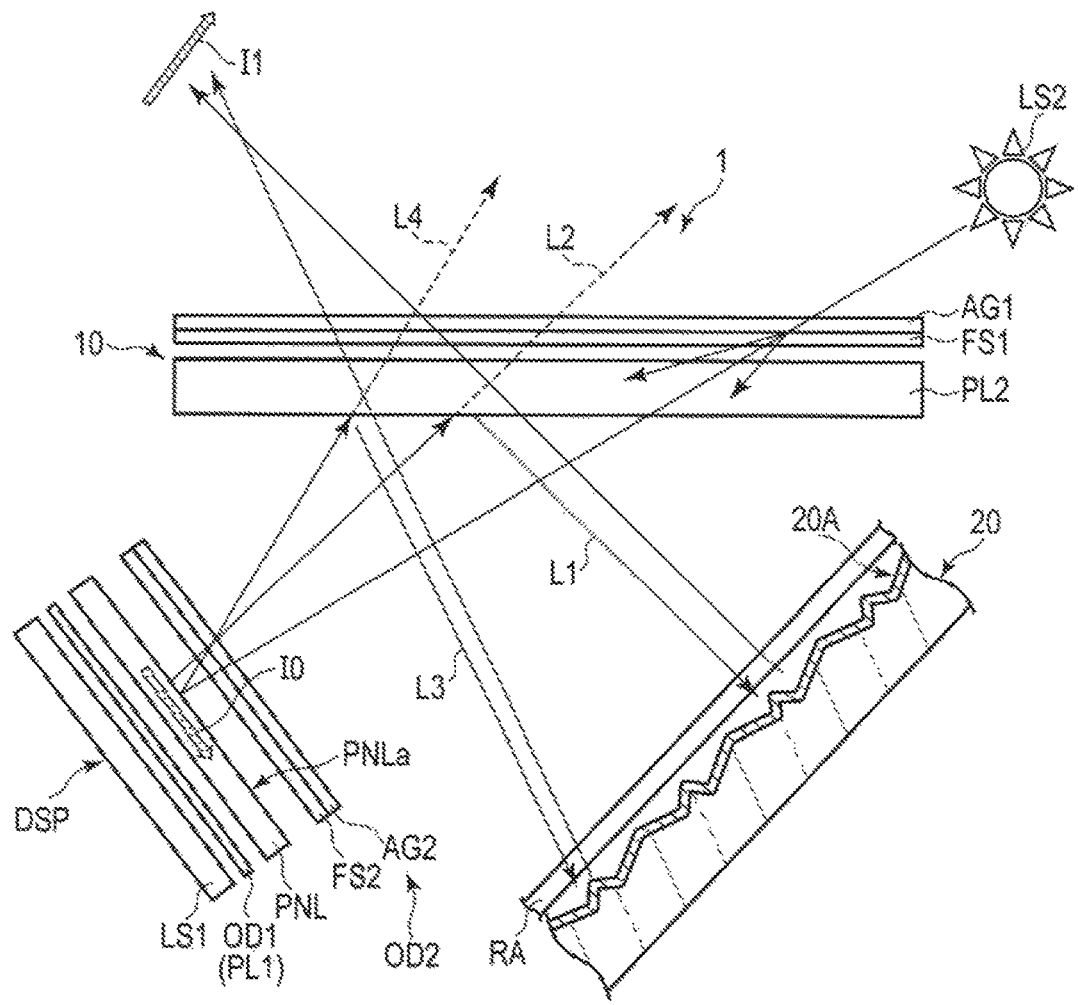
FIG. 7 is a diagram showing a configuration example of the display device 1 according to a first modification.

FIG. 7 is a diagram showing a configuration example of the display device 1 according to the first modification.

This modification is different from the configuration example shown in FIG. 1 in that the optical element 10 comprises the reflection suppressing layer AG1 and the scattering layer FS1 and that the display panel PNL is a trans-reflective liquid crystal display panel. Note that the reflection suppressing layer AG1 and the scattering layer FS1 may be omitted.

The reflection suppressing layer AG1 is disposed on an opposite side to that opposing the display DSP of the polarizing element PL2 and the reflective element 20. The scattering layer FS1 is located between the polarizing element PL2 and the reflection suppressing layer AG1. For example, the scattering layer FS1 is adhered to the polarizing element PL2, and the reflection suppressing layer AG1 is adhered to the scattering layer FS1. The reflection suppressing layer AG1 may be of a structure similar to that of the reflection suppressing layer AG2, and the scattering layer FS1 may be of a structure similar to that of the scattering layer FS2. Here, it is preferable that the scattering layer FS1 be an anisotropic scattering layer which scatters the light entering from the external light source LS2 and transmits the light entering from the reflective element 20 without substantially scattering. With this structure, the display device 1 can equalize the luminance of the light entering the display panel PNL from the external light source LS2 within the place of the surface PNLa while suppressing blurriness of the display image I1 caused by dispersion of the light L1 and L3, thus making it possible to suppress non-uniformity in image formation of the display image I1.

Figure 8:
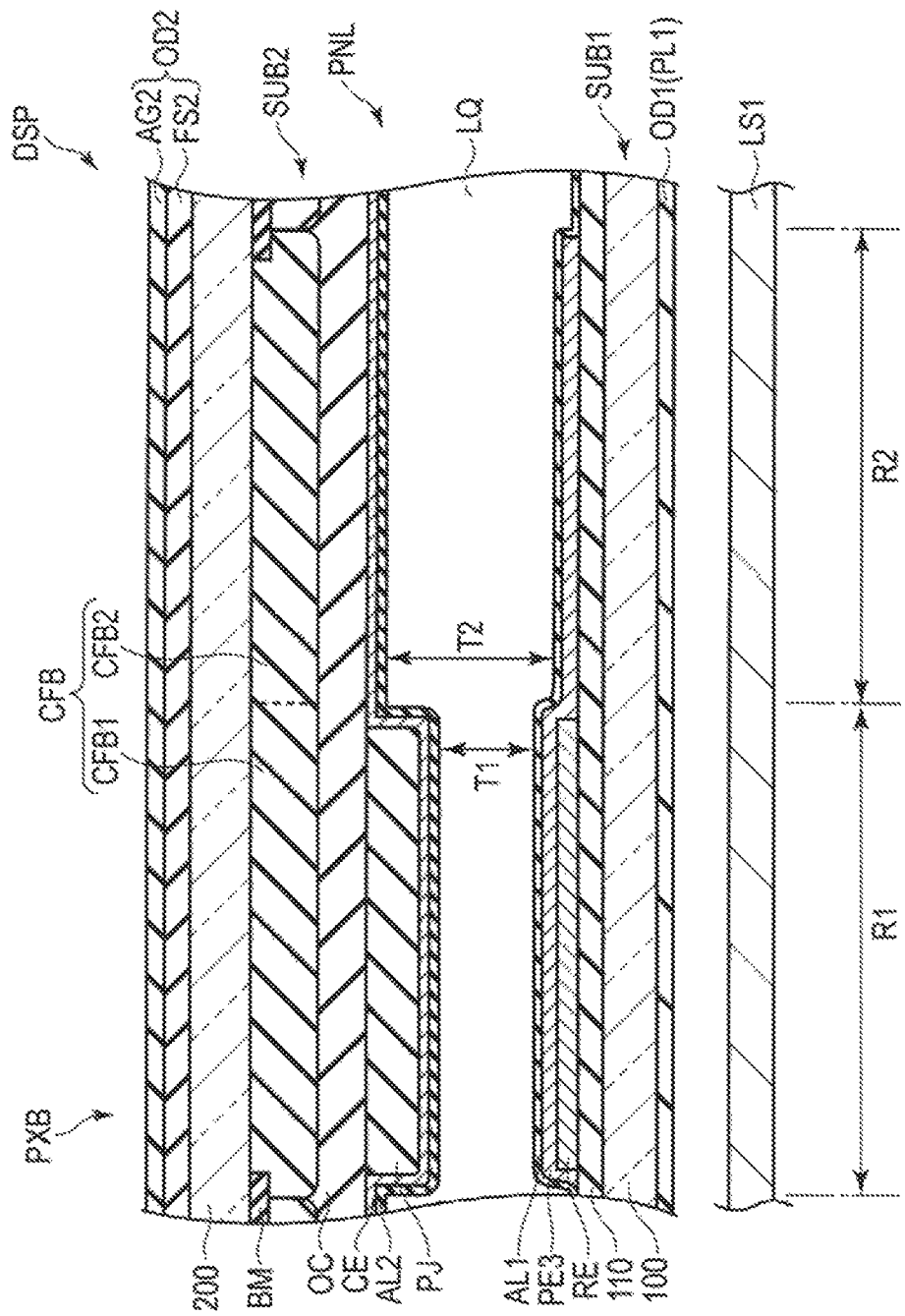
FIG. 8 is a diagram showing a configuration example of a display panel PNL shown in FIG. 7.

FIG. 8 is a diagram showing a configuration example of the display panel PNL shown in FIG. 7.

As an example of the cross-sectional structure of the display DSP, a region corresponding to a blue pixel PXB is depicted. This modification is different from the configuration example shown in FIG. 3 in comprising a reflective layer RE and a projection PJ. Further, another difference from the configuration example shown in FIG. 3 is that the pixel electrode PE3 is disposed on the first substrate SUB1 and the common electrode CE is provided in the second substrate SUB2. In this configuration example, the pixel electrode PE3 is located between the first insulating film 110 and the first alignment film AL1. The common electrode CE is located between the overcoat layer OC and the second alignment film AL2. Note that the other subpixels (reds pixel PXR and green pixels PXG) have a structure similar to that of the blue pixel PXB, although their illustration is omitted.

The blue pixel PXB includes a first region R1 and a second region R2. The light entering the first region R1 is reflected, and the light entering the second region R2 passes therethrough. The color filter CFB includes a color filter CFB1 disposed on a region corresponding to the first region R1 and another color filter CFB2 disposed on a region corresponding to the second region R2. The color filters CFB1 and CFB2 are color filters CFB of the same color of blue.

The transmissivity of the color filter CFB1 may be different from that of the color filter CFB2. The light reflected by the first region R1 passes through the color filter CFB1 two times, whereas the light reflected by the second region R2 passes through the colds filter CFB2 one time. Therefore, by setting the transmissivity of the color filter CFB1 higher than that of the color filter CFB2, the tint of the blue pixel PXB can be made uniform. The transmissivity of the color filter CFB can be controlled by the concentration of the color material, the thickness of the color filter or the like. For example, with half-tone exposure, the color filter CFB1 and the color filter CFB2, different in thickness, can be formed in batch.

In the region corresponding to the first region R1, the reflective layer RE is disposed. The reflective layer RE opposes the color filter CFB1. The reflective layer RE is provided in the first substrate SUB1 so as to be spaced from the liquid crystal layer LQ further than from the pixel electrode PE3. In the example illustrated, the reflective layer RE is located between the first insulating film 110 and the pixel electrode PE3 and covered by the pixel electrode PE3. The reflective layer RE is light-reflective and formed from, for example, a material having light reflectivity, such as Ag or Al. When the reflective layer RE is formed from a metal material having conductivity higher than that of the transparent conductive material, the reflective layer RE should be brought into contact with the pixel electrode PE3. With this structure, non-uniformity in voltage applied to the pixel electrode PE3 can be suppressed. In the case of such a structure that both the pixel electrode PE3 and the common electrode CE are provided in the first substrate SUB1, the reflective layer RE is disposed to be spaced from the liquid crystal layer LQ further than from both of the pixel electrode PE3 and the common electrode CE.

In the region corresponding to the first region R1, the projection PJ is provided as well. The projection PJ is arranged between the overcoat layer OC and second alignment film AL2, and is covered with common electrode CE, for example. The projection PJ is formed from the same material as that of the overcoat layer OC, for example, and may be continuous to the overcoat layer OC.

The liquid crystal layer LQ has a thickness T1 in the first region R1 and a thickness T2 in the second region R2. The thickness T1 is less than the thickness T2. For example, the thickness T2 is substantially double the thickness T1. The thickness T1 is controlled by the thickness of the projection PJ. In this configuration example, the pixel electrode PE3 is disposed over from the first region R1 to the second region R2. Therefore, in order to impart a phase difference between the polarized light passing through a section of the liquid crystal layer LQ, which corresponds to the first region R1 and the polarized light passing through another section of the liquid crystal layer LQ, which corresponds to the second region R2, the liquid crystal layer LQ having variable thicknesses T1 and T2 from one section to another is provided. However, for example, when the pixel electrode of the first region R1 is so spaced away from the pixel electrode of the second region R2 that the electric field created in the liquid crystal layer LQ of the first region R1 and the electric field formed in the liquid crystal layer LQ of the second region R2 can be made different from each other, the thickness T1 and the thickness T2 may be substantially equal to each other.

FIG. 9 is a flowchart illustrating the optical paths of light L3 and light L4 in the display device 1 shown in FIG. 7.

An example of the behavior of the light entering the display device 1 from an external light source LS2 will be described. The light L3 and light L4 are light entering the display device 1 from the external light source LS2 and reflected by the display panel PNL. The light L3 contributes to image formation of the display image I1 and the light L4 is that diverges.

The behaviors of the light L3 and L4 from the point where reflected by the display panel PNL to the point immediately before entering the polarizing element PL2 will be described as a first' stage PH1'. Note that the behaviors of the light L3 and L4 after reflected by the display panel PNL are similar to those of the light L1 and L2, respectively, in the second stage PH2 illustrated in FIG. 6, and therefore their explanations will be omitted.

In the first' stage PH1', unpolarized light L3 and L4 are emitted from the illumination device LS2, and are converted into the first linearly polarized light while passing through the polarizing element PL2. Next, the light L3 is converted into circularly while passing through the liquid crystal layer LQ, and then is reflected by the reflective layer RE. Then, once again, the light L3 passes through the liquid crystal layer LQ, and is converted into the second linearly polarized light. On the other hand, the light L4 passes through the liquid crystal layer LQ while maintaining itself as the first linearly polarized light. Then, the light L4 is reflected by the reflective layer RE and once again passes through the liquid crystal layer LQ.

In the first modification, an advantageous effect similar to that described above can be obtained. Moreover, according to this configuration example, the light irradiated from the external light source LS2 can be utilized to form the display image I1, and therefore the power consumption of the illumination device LS1 can be reduced.

Next, the second and third modifications will be described with reference to FIGS. 10 to 15. In the second and third modifications, either one of the transmissive and transreflective liquid crystal display panels is applicable to the display panel PNL. In the following description, the display device 1 comprising the display panel PNL shown in FIG. 8, which is provided with an external light source LS2, will be explained.

[Second Modification]

Figure 10:
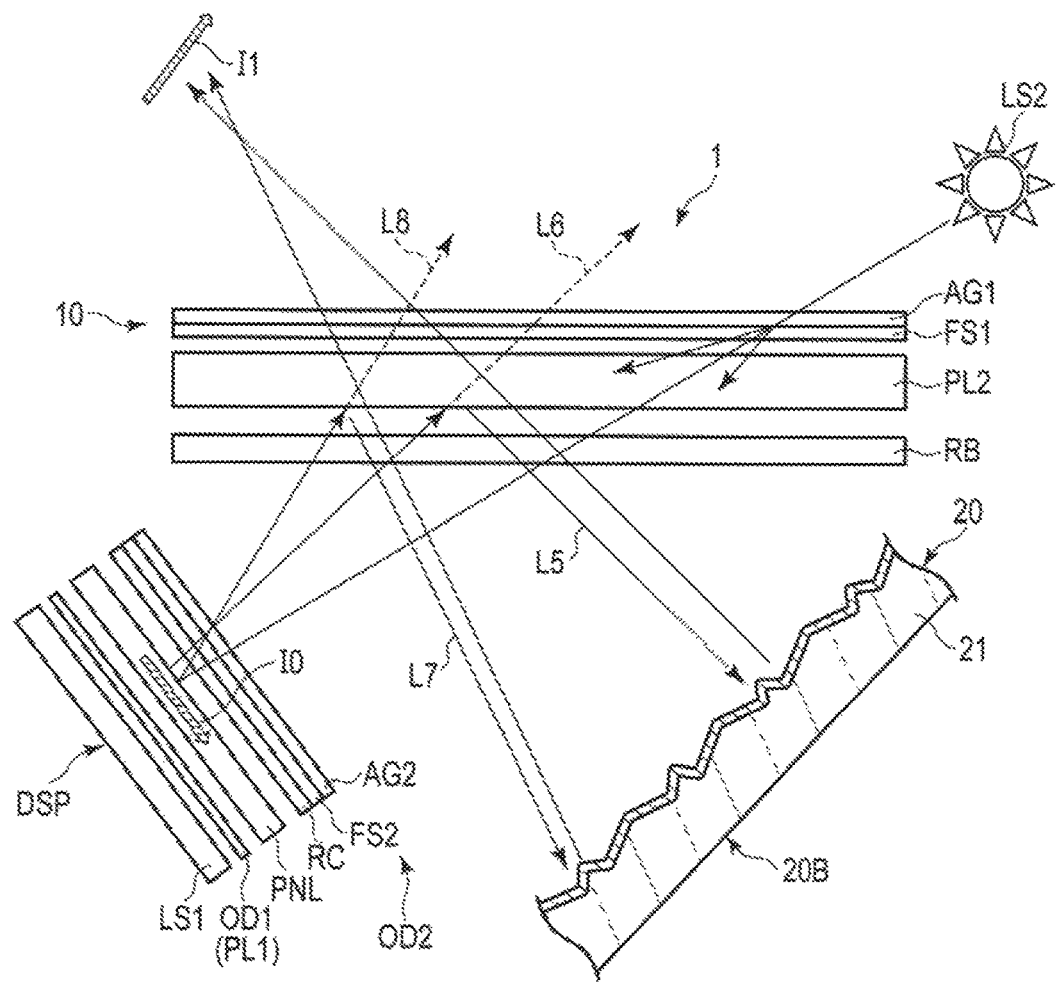
FIG. 10 is a diagram showing a configuration example of the display device 1 according to a second modification.

FIG. 10 is a diagram showing a configuration example of the display device 1 according to the second modification. This modification is different from the configuration example illustrated to FIG. 7 in that retardation films RB and RC are provided but a retardation film RA is not provided. The retardation films RB and RC are ¼λ plates which impart a phase difference of approximately ¼λ to the transmitting light and have a structure similar to that of, for example, the retardation film RA. The retardation film RB is disposed in the optical element 10 on a side opposing the display DSP of the polarizing element PL2 and the reflective element 20. The retardation film RC is disposed on the optical element OD2 and is located, for example, between the display panel PNL and the scattering layer FS2. The retardation film RC may be provided between the scattering layer FS2 and the reflection suppressing layer AG2 or on a side of the optical element OD2, which opposes the optical element 10.

FIG. 11 is a flowchart illustrating the optical paths of light L5 and light L6 in the display device 1 shown in FIG. 10.

The light L5 and L6 are an example of the light emitted from the illumination device LS1 and passing through the display panel PNL. The light L5 contributes to the formation of the display image I1, and the light L6 is that diverges.

The behaviors of the light L5 and L6 from the point where having passed the display panel PNL to the point immediately before entering the retardation film RC will be described as a third stage PH3 and those after passing through the display panel PNL will be described as a fourth stage PH4, which will now be provided in this order.

In the third stage PH3, at the beginning, unpolarized light L5 and L6 are emitted from the illumination device LS1. The unpolarized light L5 and L6 pass through the polarizing element PL1 and are converted into the second linearly polarized light. Next, while the light L5 passing through the display panel PNL, it is converted into the first linearly polarized light. On the other hand, the light L6 passes through the display panel PNL while maintaining itself as the second linearly polarized light.

In the fourth stage PH4, the light L5, which is now the first linearly polarized light, is converted into circularly polarized light while passing through the retardation film RC, and then converted into the second linearly polarized light while passing through the retardation film RC. The light L5, which is now the second linearly polarized light, is reflected by the polarizing element PL2, and then converted into circularly polarized light while passing through the retardation film RB. Next, the light L5 is retro-reflected by the retroreflective surface 20A and is converted into the first linearly polarized light while once again passing through the retardation film RB. Then, the light L5, which is not the first linearly polarized light, passes through the polarizing element PL2, and forms the display image I1. On the other hand, the light L6, which is not the second linearly polarized light, emitted from the display panel PNL is converted into circularly polarized light while passing through the retardation film RC, and then converted into the first linearly polarized light while passing through the retardation film RB. After that, the light L6, which is now the first linearly polarized light, passes through the polarizing element PL2, and is diverged to the outside of the display device 1.

Figure 12:
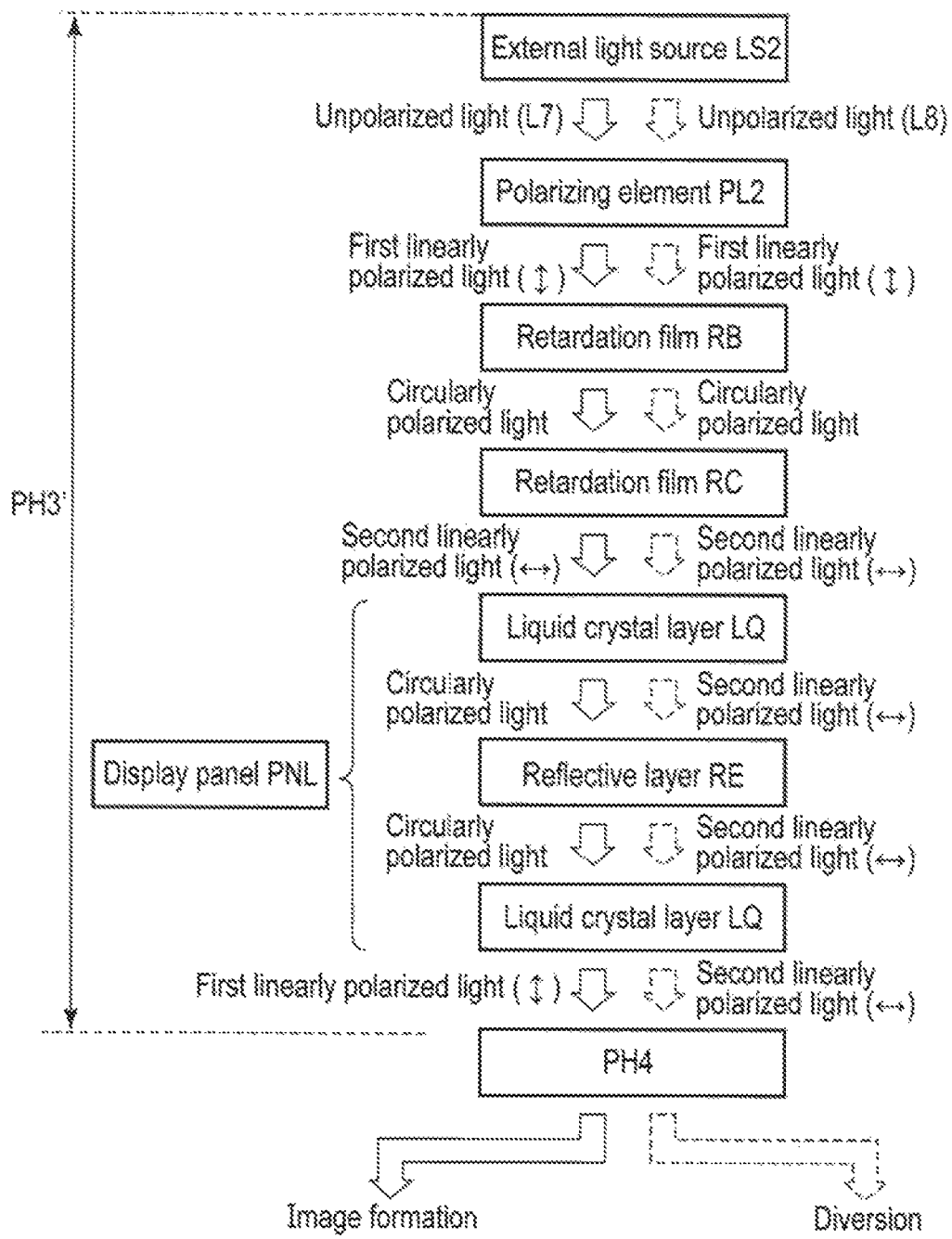

FIG. 12 is a flowchart illustrating the optical paths of light L7 and L8 in the display device 1 shown in FIG. 10.

The light L7 and L8 are an example of the light entering the display device 1 from the external light source LS2, and are reflected by the display panel PNL. The light L7 contributes to the formation of the display image I1, and the light L8 is that diverges.

The behaviors of the light L7 and L8 from the point when reflected by the display panel PNL to the point immediately just before entering the retardation film RC will be described as a third' stage PH3'. The behaviors of the lights L7 and L8 after reflected by the display panel PNL are similar to those of the light L5 and L6 in the fourth stage PH4 illustrated in FIG. 11, and therefore their explanations will be omitted.

In the third' stage PH3', the unpolarized lights L7 and L8 are emitted from the external light source LS2 and converted into the first linearly polarized light while passing through the polarizing element PL2. The light L7, which is now the first linearly polarized light, is converted into circularly polarized light while passing through the retardation film RB and then converted into the second linearly polarized light while passing through the retardation film RC. Next, the light L7 is converted into circularly polarized light while passing through the liquid crystal layer LQ and is reflected by the reflective layer RE. The light is then converted into the first linearly polarized light while once again passing through the liquid crystal layer LQ. On the other hand, the light L8 having passed through the polarizing element PL2, which is now the first linearly polarized light, is converted into circularly polarized light while passing through the retardation film RB, and is converted into the second linearly polarized light while passing through the retardation film RC. Next, the light L8 passes through the liquid crystal layer LQ while maintain its second linearly polarized state. The, the light is reflected by the reflective layer RE, and once again passes through the liquid crystal layer LQ.

[Third Modification]

Figure 13:
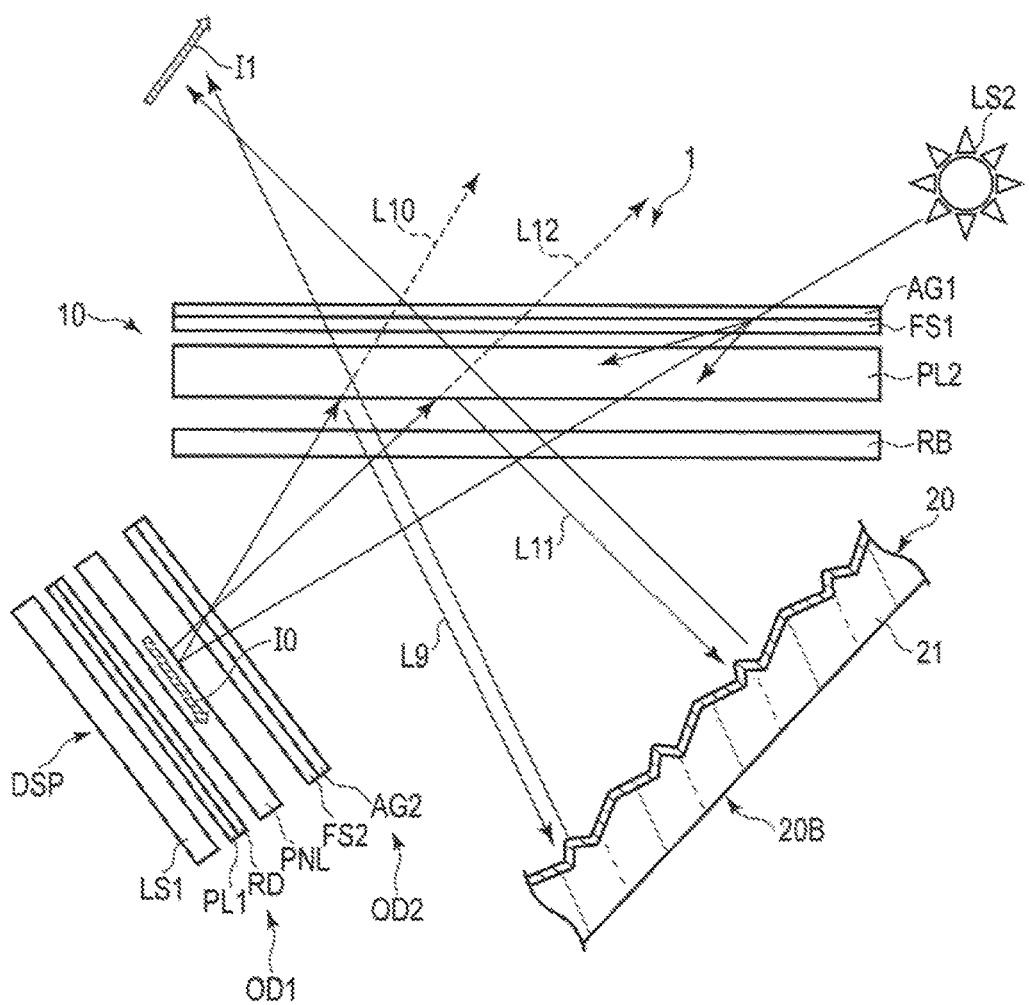
FIG. 13 is a diagram showing a configuration example of the display device 1 according to a third modification.

FIG. 13 is a diagram showing a configuration example of the display device 1 according to the third modification.

This modification is different from the configuration example illustrated in FIG. 7 in that the retardation films RB and RD are provided, but the retardation film RA is not provided. The structure and the position of the retardation film RB are similar to those of the second modification shown in FIG. 10. The retardation film RD is a ¼λ plate which imparts a phase difference of approximately ¼λ to the transmitting light and has a structure similar to that of, for example, the retardation film RA. The retardation film RD is located between the polarizing element PL1 and the display panel PNL and provided in, for example, the optical element OD1.

FIG. 14 is a flowchart illustrating the optical paths of light L9 and L10 in the display device 1 shown in FIG. 13.

The lights L9 and L10 are an example of the light emitted from the illumination device LS1 and passing through the display panel PNL. The light L9 contributes to the formation of the display image I1, and the light L10 is that diverges.

The behaviors of the light L9 and L10 from the point where having passed the display panel PNL to the point immediately before entering the retardation film RB will be described as a fifth stage PH5 and those after passing through the display panel PNL will be described as a sixth stage PH6, which will now be provided in this order.

In the fifth stage PH5, at the beginning, the unpolarized light L9 and L10 are emitted from the illumination device LS1. The unpolarized light L9 and L10 are converted into the second linearly polarized light while passing through the polarizing element PL1. Next, the light L9 and L10 are converted into circularly polarized light while passing through the retardation film RD. Then, the light L9 is converted into reverse circularly polarized light while passing through the display panel PNL. On the other hand, the light L10 passes through the display panel PNL while maintaining the rotation direction of the circularly polarized light.

In the sixth step PH6, the light L9, which is not the circularly polarized light, is converted into second linearly polarized light while passing through the retardation film RB. Then, the light is reflected by reflective element PL2 and converted into circularly polarized light while passing through the retardation film RB. Next, the light L9 is retro-reflected by the retroreflective surface 20A and is converted into the first linearly polarized light while once again passing through the retardation film RB. After that, the light L9, which is now the first linearly polarized light, passes through the polarizing element PL2, and forms the display image I1. On the other hand, the light L10, which is now the circularly polarized light of rotation reverse to that of the light L9, is converted into the first linearly polarized light while passing through the retardation film RB, and passes through the polarizing element PL2 to diverge to the outside of the display device 1.

Figure 15:
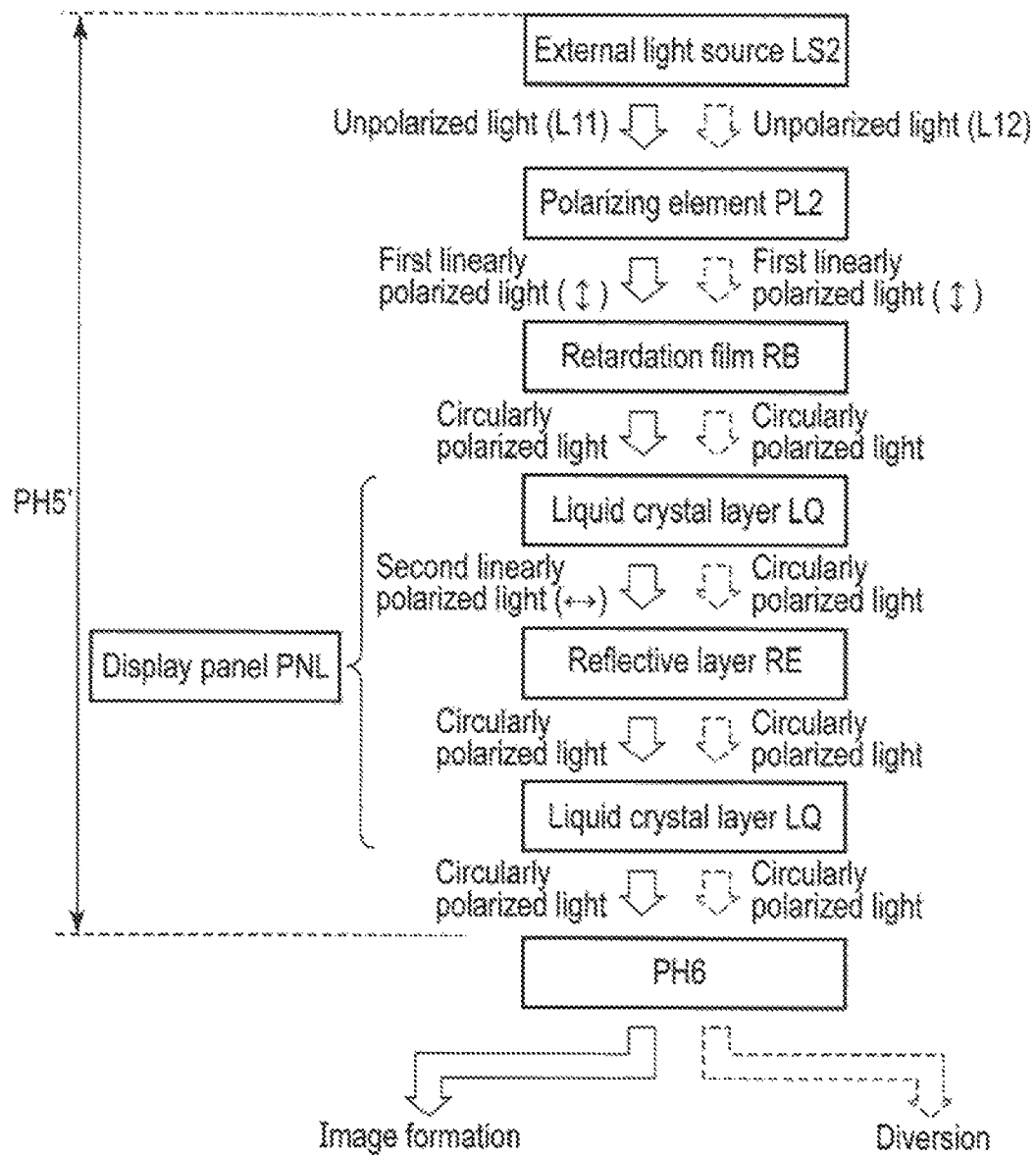
FIG. 15 is a flowchart indicating optical paths of light L11 and L12 in the display device 1 shown in FIG. 13.

FIG. 15 is a flowchart illustrating the optical paths of light L11 and L12 in the display device 1 shown in FIG. 13.

The light L11 and L12 are an example of the light entering the display device 1 from the external light source LS2 reflected by the display panel PNL. The light L11 contributes to the formation of the display image I1, and the light L12 is that diverges.

The behaviors of the light L11 and L12 from the point when reflected by the display panel PNL to the point immediately just before entering the retardation film RB will be described as a fifth' stage PH5'. The behaviors of the lights L11 and L12 after reflected by the display panel PNL are similar to those of the light L5 and L6 in the sixth stage PH6 illustrated in FIG. 14, and therefore their explanations will be omitted.

In the fifth' stage PH5', the unpolarized light L11 and L12 are emitted from the external light source LS2 and are converted into the first linearly polarized light while passing through the polarizing element PL2. Then, the light is converted into the circularly polarized right while passing through the retardation film RB. Next, the light L11, which is now the circularly polarized light, is converted into the second linearly polarized light while passing through the liquid crystal layer LQ. Then, the light is reflected by the reflective layer RE and is converted into circularly polarized light while once again passing through the liquid crystal layer LQ. On the other hand, the light L12 having passed through the retardation film RE passes through the liquid crystal layer LQ while maintaining its circularly polarized state, and is reflected by the reflective layer RE to once again pass through the liquid crystal layer LQ.

An advantageous effect similar to that described above can be obtained also in the second and third modifications.

[Second Embodiment]

Next, a configuration example of the display device 1 which does not comprise the illumination device LS1 but forms the display image I1 using the external light source LS2 will be described. In the second embodiment, the display DSP is a reflector which reflects light, and can take a structure similar to that of the first embodiment except that the display DSP is without the illumination device LS1. For example, by replacing the display DSP shown in FIG. 7, 10 or 13 with a reflective liquid crystal display, the configuration example of the second embodiment can be obtained. As to the behavior of light Lout which enters the display DSP from outside the display device 1, the light L3 and L4 described with reference to FIG. 9, the light L7 and L8 in FIG. 12, and the light L11 and L12 in FIG. 15 can be referred to.

Figure 16:
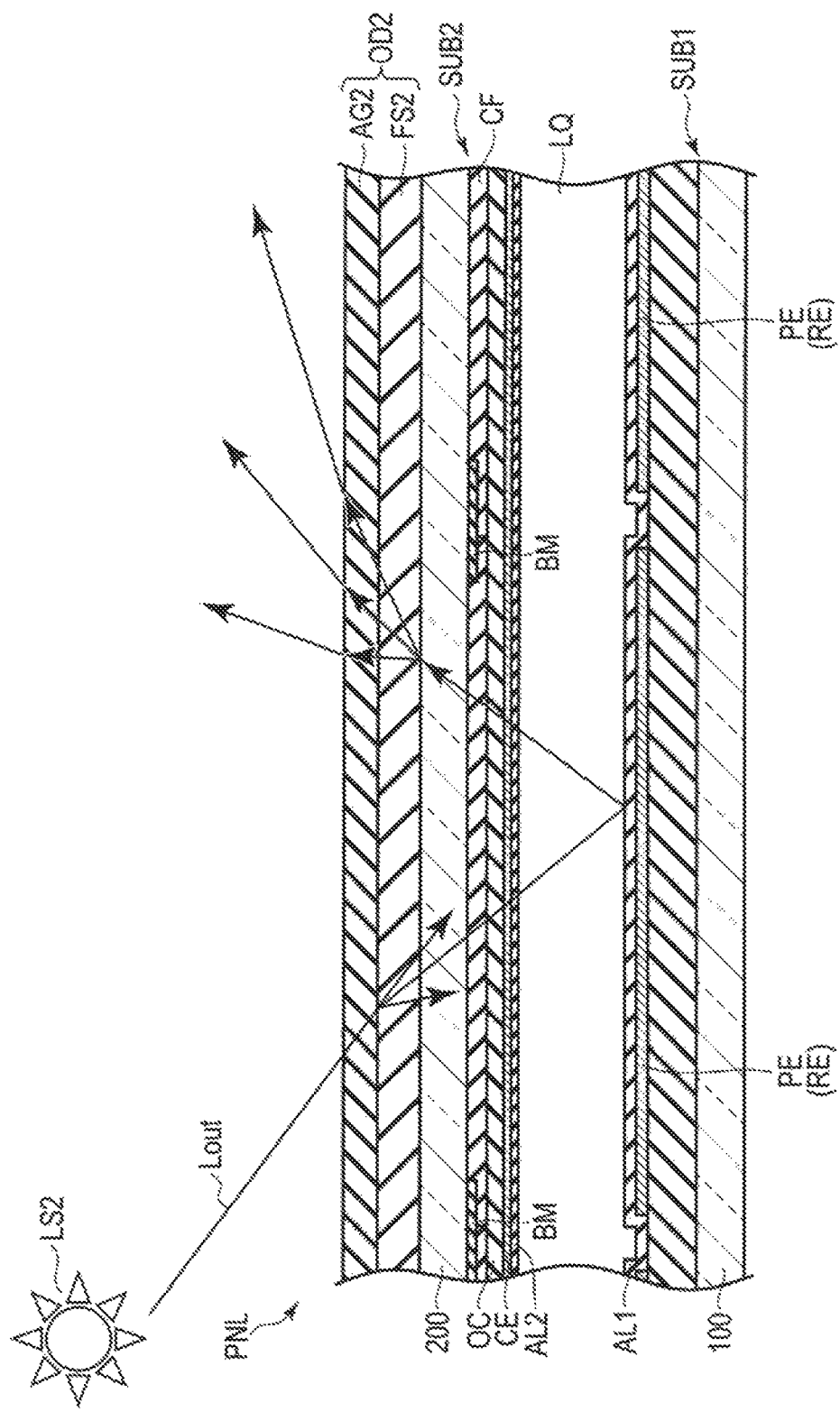
FIG. 16 is a cross section showing a configuration example of a display panel PNL in a second embodiment.

FIG. 16 is a cross section showing a configuration example of the display panel PNL in the second embodiment.

The display panel PNL of this configuration example has a structure equivalent to that of the display panel PNL illustrated in FIG. 8 except that it does not comprise the projection PJ and the reflective layer RE is provided to cover an entire surface of each pixel electrode PE. The optical element OD2 does not comprise a polarizing element, and the light Lout passes through the optical element OD2 while maintaining its polarized state. The display panel PNL comprises pixel electrodes PE provided on the first substrate SUB1 and a common electrode CE provided on the second substrate SUB2. Each pixel electrode PE comprises a reflective layer RE. The reflective layer RE is provided all around the opening surrounded by the light-shielding layers BM of the pixels. Here, the explanation is provided by focusing on an example of the display panel PNL to which a display mode utilizing a vertical electric field is applied. But, in the case of a lateral electric field display panel PNL in which both the pixel electrodes PE and the common electrode CE are provided on the first substrate SUB1, it suffices if the reflective layer RE is provided for one of the pixel electrode PE and the common electrode CE, which is spaced apart from the liquid crystal layer LQ. For example, in the case of the FFS mode display panel PNL illustrated in FIG. 3, the reflective layer RE is provided in the common electrode CE so as to oppose over a plurality of pixel electrodes PE.

According to this configuration example, the illumination device LS1 and the polarizing element PL1 can be omitted. As a result, according to second embodiment, it is possible to reduce the manufacturing cost of the display device 1 and the power consumption. Further, since the optical element 10 comprises the polarizing element PL2 corresponding to a reflective polarizer, the optical element 10 can efficiently reflect or transmit the light reflected by the display DSP while efficiently transmitting the light Lout from the external light source LS2. Thus, the degradation is display quality of the display device 1 can be suppressed.

In addition, as long as it functions as a reflector, the display DSP is not limited to a liquid crystal display, but may be display media such aa posters and three-dimensional objects. In that case, the optical elements 10 may not have a function of a polarizing filter, or may be a beam splitter such as a half mirror which transmits or reflects incidence light.

[Fourth Modification]

Figure 17:
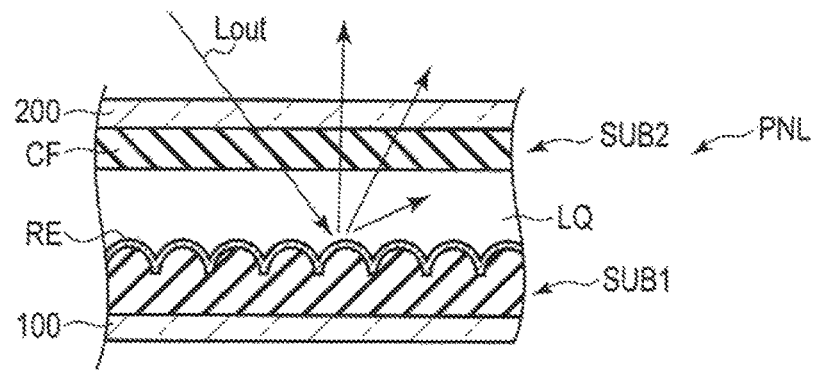
FIG. 17 is a cross section showing a configuration example of a display panel PNL in a fourth modification.

FIG. 17 is a cross section showing a configuration example of the display panel PNL in the fourth modification. This modification is another modified version of the display panel PNL applicable to the second embodiment. A surface of the reflective layer RE on a side opposing the liquid crystal layer LQ comprises a plurality of convexities., The pitch of the convexities on the reflective layer RE should desirably be less the width of the subpixels.

In this modification, the light Lout reflected by the reflective layer RE can be scattered, and the light emitted from the display panel PNL can be diffused. This modification is applicable also to the first embodiment. In that case, not only the reflective layer RE but also the common electrode CE and the pixel electrodes PE may be formed to have a concavo-convex shape, with which the light passing through the display panel PNL can also be diffused.

[Fifth Modification]

Figure 18:
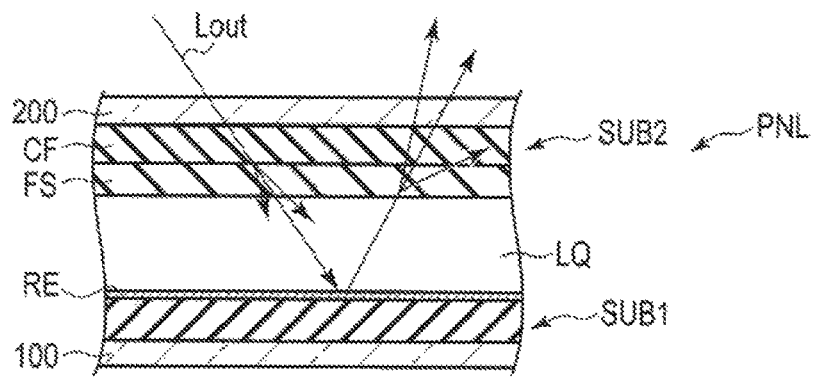
FIG. 18 is a cross section showing a configuration example of a display panel PNL in a fifth modification.

FIG. 18 is a cross section showing a configuration example of the display panel PNL in the fifth modification. This modification is different from the configuration example illustrated in FIG. 16 in that the scattering layer FS is located between the color filter CF and the liquid crystal layer LQ. Note that this modification is applicable also to the first embodiment. In that case, the scattering layer FS2 is spaced from the optical element OD2 and built in the display panel PNL. According to this modification, the light emitted from the display panel PNL can be diffused.

[Sixth Modification]

Figure 19:
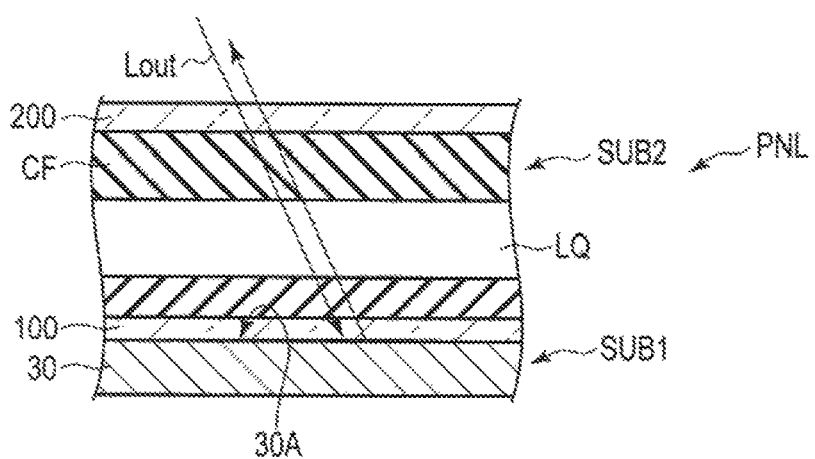
FIG. 19 is a cross section showing a configuration example of a display panel PNL in a sixth modification.

FIG. 19 is a cross section showing a configuration example of the display panel PNL in the sixth modification.

This modification is different from the configuration example illustrated in FIG. 16 in that the reflective element 30 having retroreflectivity, corresponding to a reflective layer is located on an opposite side to that opposing the optical element 10 of the display panel PNL. The reflective element 30 comprises a retroreflective surface 30A on a side opposing the display panel PNL. The light Lout entering the display panel PNL passes through the display panel PNL, and is retro-reflected by the retroreflective surface 30A. Then, the light once again passes through the display panel PNL and is emitted from the display panel PNL. According to such structure, the light Lout can be reflected by the display DSP in a specific direction, and therefore it is possible to reduce the loss of the light Lout, which is caused by being not reflected is a direction in which the optical element 10 is located, thereby making it possible to raise the use efficiency of the light Lout.

Note that the display DSP in this modification is not limited to the structure comprising the display panel PNL, but it suffices if it is a reflector comprising a light-transmissive display and a retroreflective surface 30A located on an opposite side to that opposing the optical element 10.

[Third Embodiment]

As a configuration example of the third embodiment comprising a display DSP (reflector) illustrated in FIGS. 16 to 19, a display device 1 comprising a display DSP illustrated in FIG. 19 and a mirror array MP as the optical element 10 will be described. This embodiment is applicable to the display DSP used in the second embodiment without being particularly limited.

FIG. 20 is a diagram showing a configuration example of the display device 1 according to the third embodiment.

The display device 1 comprises a display DSP and an optical element 10, which is provided with a mirror array MP. The mirror array MP reflects light entering from one side to a direction symmetrical to the entering direction on the other side with respect to the mirror array MP itself as a plane of symmetry. The mirror array MP comprises an outer surface 10B located on a display image I1 side and an inner surface 10A located on an opposite side to the outer surface 10B and opposing the display DSP. The light entering the mirror array MP from the display DSP enters the inner surface 10A, and the light is reflected within the mirror array MP and emitted from the outer surface 10B.

The mirror array MP comprises a plurality of dihedral corner reflectors each comprising two specular surfaces perpendicularly crossing each other, which reflects incidence light two times to emit. In the example illustrated, the mirror array MP has such a structure that two sets of assemblies of prism glass materials 70 each comprising a specular surface 70A in a longitudinal surface are arranged so that the specular surfaces face the same direction in each respective set, and these sets are stacked on one another so that the specular surfaces 70A of the respective sets perpendicularly cross each other. The structure of the mirror array MP is not limited to this, but it may be, for example, a combination of a plurality of plate materials of metal or glass, whose both sides or one side is formed into a reflective surface, arranged in a grid so as to perpendicularly cross each other.

According to such a configuration example, a display device 1 which can achieve a low power consumption by using external light can be provided. Further, virtual images which may be created by the reflective element 20 are visible, and therefore the degradation of the quality of the display image I1 can be suppressed

[Seventh Modification]

The optical element 10 may be a combination of the polarizing element PL2, which corresponds to an absorptive polarizer, and a beam splitter HM. The optical element 10 comprising the beam splitter HM is applicable to any configuration example of either one of the first and second embodiments. An example of such a configuration comprising the optical element 10 is shown in FIG. 21.

Figure 21:
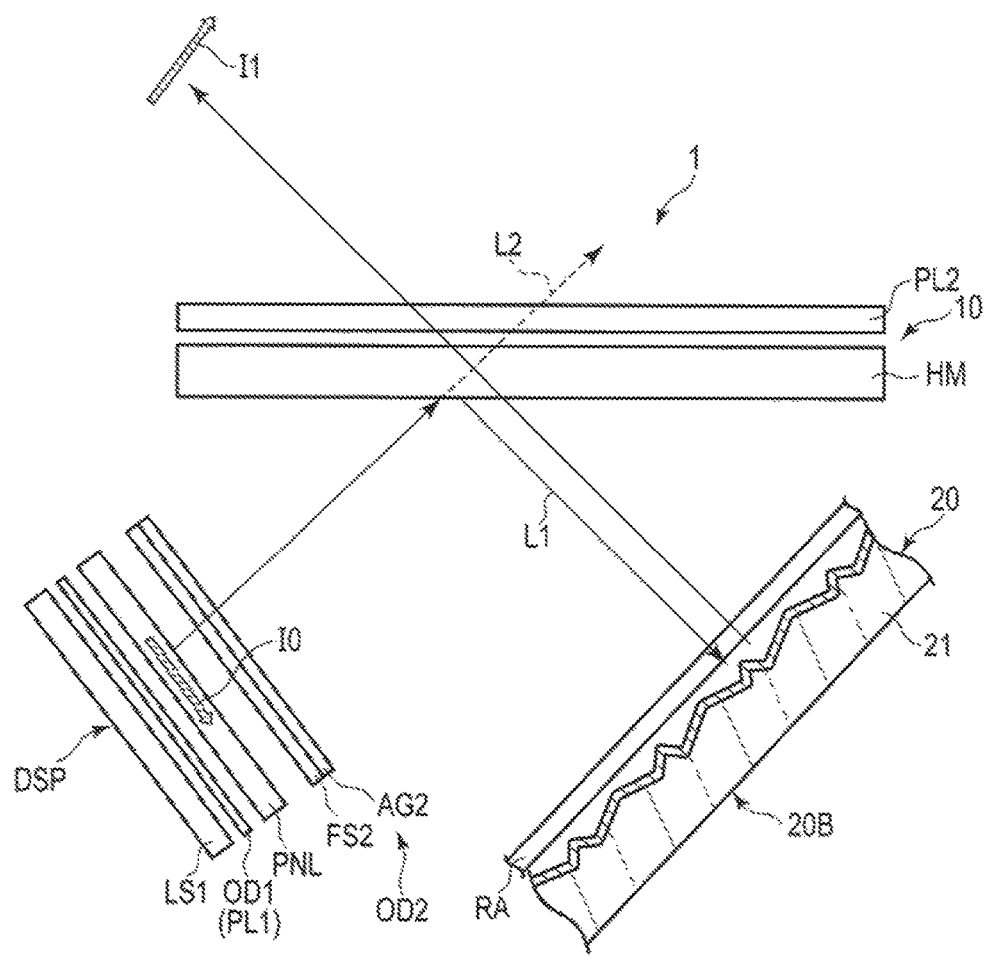
FIG. 21 is a diagram showing a configuration example of the display device 1 in a seventh modification.

FIG. 21 is a diagram showing a configuration example of the display device 1 according to the seventh modification.

The beam splitter HM is a half mirror, for example. The beam splitter HM is provided on a side opposing the display DSP of the polarizing element PL2 and the reflective element 20. The polarizing element PL2 comprises a transmission axis which transmits first linearly polarized light, and absorbs second linearly polarized light perpendicularly crossing the transmission axis. The beam splitter HM, regardless of polarization, reflects part of incidence light, and transmits the rest of the incidence light. That is, when the first linearly polarized light enters the optical element 10 from the display DSP, part of the first linearly polarized light is reflected by the beam splitter HM, and the rest of the first linearly polarized light passes through the polarizing element PL2. Meanwhile, when the second linearly polarized light enters the optical element 10 from the display DSP, part of the second linearly polarized light is reflected by the beam splitter HM, and the rest of the second linearly polarized light is absorbed by the polarizing element PL2. With such a modification, an advantageous effect similar to that described above can be obtained.

[Eight Modification]

The reflective element 20 may be curved. The reflective element 20 comprising a curved retroreflective surface 20A is applicable to any configuration example of the first and second embodiments. An example of the structure provided with such a reflective element 20 is shown in FIG. 22.

Figure 22:
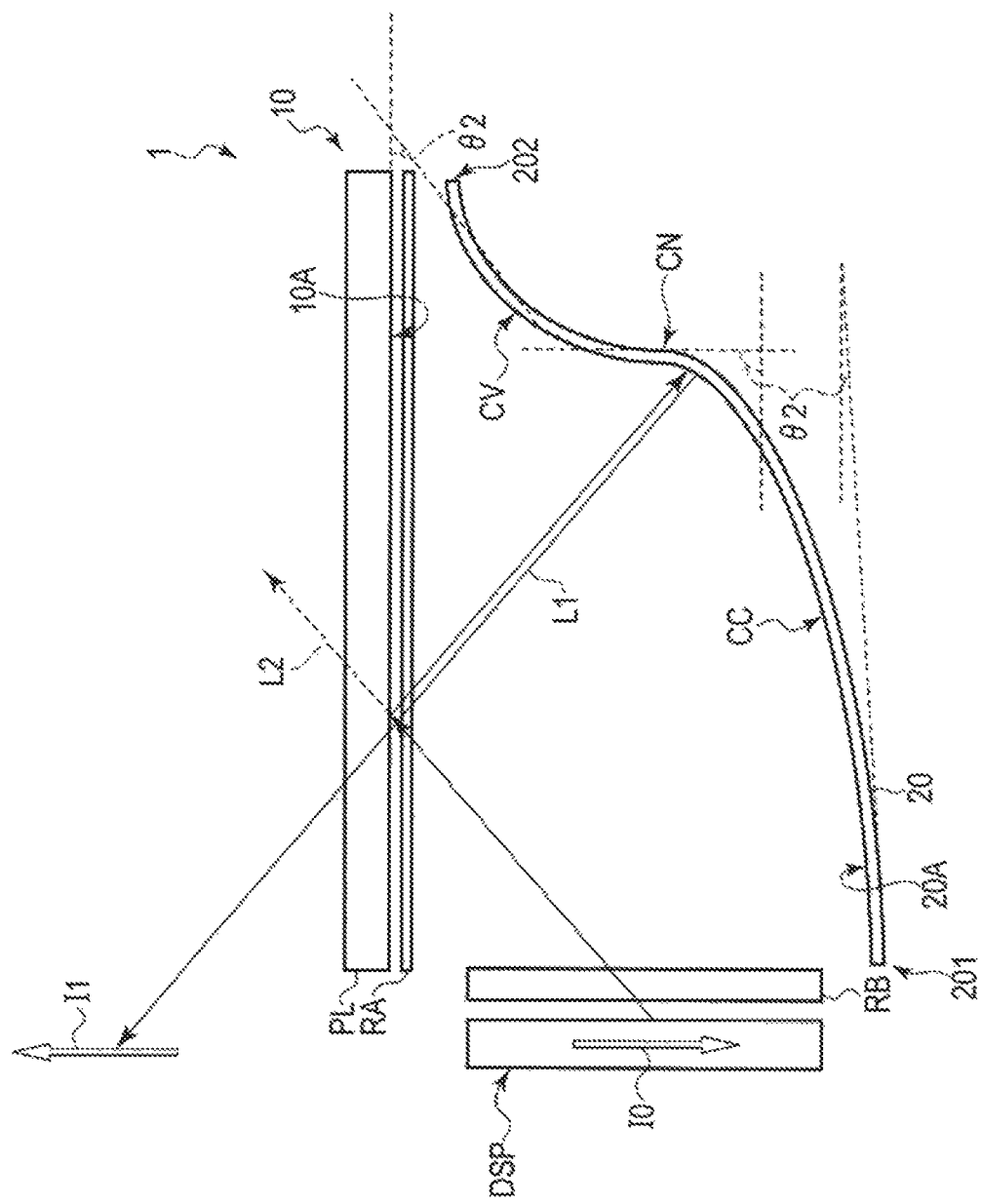
FIG. 22 is a diagram showing a configuration example of the display device 1 according to an eighth modification.

FIG. 22 is a diagram showing a configuration example of the display device 1 according to the eighth modification.

The reflective element 20 comprises the curved retroreflective surface 20A on a surface which opposes the display DSP and the optical element 10. The reflective element 20 comprises ends 201 and 202, and the end 201 is located on a side close to the display DSP, whereas the end 202 on an opposite side to the end 201. The reflective element 20 comprises a connector CN between the ends 201 and 202. The reflective element 20 comprises a first part CC and a second part CCV, and the first part CC is located between the end 201 and the connector CN, and the second part CV is located between the end 202 and the connector CN. As viewed in relation to the optical element 10, the first part CC is spaced further from the optical element 10 than from the second part CV.

The first part CC is formed into concavity and the second part CV is formed into a convexity. In this structure, the concavity means a form in which the retroreflective surface 20A recesses to a side spaced apart from the display DSP and the optical element 10. Meanwhile, the convexity means a form in which the reflective surface 60A projects to a side close to the display DSP and the optical element 10. That is, the retroreflective surface 20A comprises a concavely curved surface, corresponding to the first part CC, and a convexly curved surface, corresponding to the second part CV, and thus, in the example illustrated, the reflective element 20 has substantially an S character-shaped cross section. In the example illustrated, the first part CC and the second part CV are continuous and the reflective element 20 is formed from one component. But, note that the reflective element 20 may be formed by connecting a first part CC and a second part CV as separate components, together with a connector CN.

Since the first part CC and the second part CV have carved shapes, the degree of the angle θ2 varies with the position in the reflective element 20. In the example illustrated, the angle θ2 becomes the minimum at the end 201 in the first part CC, whereas the angle θ2 becomes the maximum in the connector CN. Further, in the second part CV, the angle θ2 becomes the minimum at the end 202, whereas the angle θ2 becomes the maximum in the connector CN. In terms of the efficiency of retro-reflection, it is desirable to set the angle θ2 in a range of greater than 0° and less than 90°. However, in the structure that separate first part CC and second part CV are connected by a connector CN, it is desirable that θ2 is an obtuse angle greater than 90° near the connector CN. The retroreflective surface 20A faces an opposite side to that opposing the optical element 10 in the connector CN, and with this arrangement, the display device 1 can suppress the entering of light to the connector CN having low retro-reflectivity, and thus can suppress the degradation of display quality.

In this modification as well, an advantageous effect similar to that described above is obtained. Moreover, according to this modification, the occurrence of the ghost caused by undesirable reflection in the reflective element 20 can be suppressed, thereby improving the visibility of the display image I1.

As described above, this embodiment can provide a display device whose manufacturing coat can be lowered and degradation of display quality can be suppressed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
an illumination unit;
a polarizing element which transmits a specific polarized component of light entering from the illumination unit;
a display panel which transmits the polarized light entering from the polarizing element while maintaining or converting a polarized state;
an optical element comprising a transmission axis which transmits first linearly polarized light, which transmits or reflects the light entering from the display panel; and
a reflective element which retro-reflects the light reflected by the optical element; wherein
the display panel and the reflective element facing one surface of the optical element.

2. The display device of claim 1, wherein
the polarizing element is absent between the display panel and the optical element.

3. The display device of claim 1, further comprising:
a first retardation film provided on a side of the reflective element opposing the optical element, which imparts a phase difference to the light passing therethrough.

4. The display device of claim 1, further comprising:
a second retardation film provided on a side of the optical element opposing the display panel and the reflective element, which imparts a phase difference to the light passing therethrough; and
a third retardation film provided on a side of the display panel opposing the optical element, which imparts a phase difference to the light passing therethrough.

5. The display device of claim 1, further comprising:
a second retardation film provided on a side of the optical element opposing the display panel and the reflective element, which imparts a phase difference to the light passing therethrough; and
a fourth retardation film provided between the polarizing element and the display panel, which imparts a phase difference to the light passing therethrough.

6. The display device of claim 1, wherein
the display panel further comprises:
a first substrate;
a second substrate disposed to oppose the first substrate;
a liquid crystal layer held between the first substrate and the second substrate;
a pixel electrode having light transmissivity; and
a common electrode opposing the pixel electrode and having light transmissivity.

7. The display device of claim 6, wherein
the display panel further comprises a reflective layer having light reflectivity.

8. A display device comprising:
a reflector which reflects light;
an optical element which transmits or reflects reflected light from the reflector; and
a reflective element which retroreflects the light reflected by the optical element, wherein
the reflector and the reflective element face one surface of the optical element; and
a polarizing element is absent between the reflector and the optical element.

9. The display device of claim 8, further comprising:
a first retardation film provided on a side of the reflective element opposing the optical element, which imparts a phase difference to the light passing therethrough.

10. The display device of claim 8, wherein
the reflector comprises a retroreflective surface located on an opposite side to that opposing the optical element, which retro-reflects light entering from the optical element.

11. ; The display device of claim 8, wherein
the reflector further comprises:
a first substrate;
a second substrate disposed to oppose the first substrate;
a liquid crystal layer held between the first substrate and the second substrate; and
a reflective layer having light reflectivity, disposed on the second substrate,
and
the optical element comprises a transmission axis which transmits first linearly polarized light, and reflects second linearly polarized light perpendicularly crossing the transmission axis.

12. A display device comprising:
a reflector which reflects light; and
an optical element which reflects reflected light from the reflector; wherein
the optical element reflects light entering from one side to a direction symmetrical to an incident direction on an other side with respect to the optical element as a plane of symmetry, and
the reflector further comprises a first substrate, a second substrate disposed to oppose the first substrate, and a liquid crystal layer held between the first substrate and the second substrate.

13. The display device of claim 12, wherein
a polarizing element is absent between the reflector and the optical element.

14. The display device of claim 12, wherein
the reflector comprises a retroreflective surface located on an opposite side to that opposing the optical element, which retro-reflects light entering from the optical element.

* * * * *